(12) United States Patent
Wisnudel et al.

(10) Patent No.: US 8,488,428 B2
(45) Date of Patent: Jul. 16, 2013

(54) ENHANCED SECURITY OF OPTICAL ARTICLE

(75) Inventors: Marc Brian Wisnudel, Clifton Park, NY (US); Ben Purushotam Patel, Niskayuna, NY (US); Kasiraman Krishnan, Clifton Park, NY (US); James Mitchell White, Niskayuna, NY (US); Andrea Jeannine Peters, Clifton Park, NY (US); Matthew Jeremiah Misner, Delanson, NY (US); Mark Rogers Johnson, Pasadena, CA (US)

(73) Assignee: NBCUniversal Media, LLC, Wilmington, DE (US)

( * ) Notice: Subject to any disclaimer, the term of this patent is extended or adjusted under 35 U.S.C. 154(b) by 1428 days.

(21) Appl. No.: 12/120,425

(22) Filed: May 14, 2008

(65) Prior Publication Data

US 2009/0285074 A1 Nov. 19, 2009

(51) Int. Cl.
*G11B 5/58* (2006.01)
*G11B 27/36* (2006.01)
*G11B 3/70* (2006.01)
*B32B 3/02* (2006.01)
*G08B 13/14* (2006.01)
*G08B 17/00* (2006.01)
*G08B 21/00* (2006.01)

(52) U.S. Cl.
USPC ............... 369/53.21; 369/53.22; 369/53.41; 369/284; 428/64.8; 428/64.4; 340/572.1; 340/572.3; 340/588; 340/660

(58) Field of Classification Search
USPC ........ 369/53.21, 53.22, 53.41, 284; 428/64.8, 428/64.4, 195.1, 913, 916; 340/572.1, 572.3, 340/588, 660
See application file for complete search history.

(56) References Cited

U.S. PATENT DOCUMENTS 3,073,955 A 1/1963 Hale
3,579,490 A 5/1971 Kordzinki et al.
(Continued)

FOREIGN PATENT DOCUMENTS

DE 102004044002 9/2005
EP 0932148 7/1999
(Continued)

OTHER PUBLICATIONS

White, Ron, "How Computers Work", Millennium Ed., Que Corporation, Indianapolis, IN. 1999.

(Continued)

*Primary Examiner* — Aneeta Yodichkas
(74) *Attorney, Agent, or Firm* — Fletcher Yoder, P.C.

(57) ABSTRACT

An optical article comprising a first file encoded on the optical article comprising data structure information; a second file encoded on the optical article comprising a backup of the first file; wherein at least one of the first file or the second file must be fully readable for the player to read the data on the optical article; and a mark disposed on at least a portion of the optical article where the first file is encoded and at least a portion of the optical article where the second file is encoded; wherein the mark comprises an optical state change material; wherein the optical state change material undergoes a change in its optical state when exposed to an activation signal selected from one or more of a laser, thermal energy, infrared rays, X-rays, gamma rays, microwaves, visible light, ultraviolet light, ultrasound waves, radio frequency waves, electrical energy, chemical energy, magnetic energy, and mechanical energy; wherein the optical article is transformed from a pre-activated state to an activated state when an authorized activation method is used; and wherein the optical article is transformed from a pre-activated state to an incorrectly activated state when an unauthorized activation method is used.

36 Claims, 7 Drawing Sheets

U.S. PATENT DOCUMENTS

| | | |
|---|---|---|
| 3,757,087 A | 9/1973 | Bernard |
| 4,309,255 A | 1/1982 | Gendler et al. |
| 4,374,001 A | 2/1983 | Bernier |
| 4,439,280 A | 3/1984 | Gendler et al. |
| 4,443,302 A | 4/1984 | Gendler et al. |
| 4,444,626 A | 4/1984 | Bernier et al. |
| 4,454,179 A | 6/1984 | Bennett et al. |
| 4,478,687 A | 10/1984 | Gendler et al. |
| 4,575,621 A | 3/1986 | Dreifus |
| 4,627,531 A | 12/1986 | Clemens |
| 4,640,727 A | 2/1987 | Janssen |
| 4,829,509 A | 5/1989 | Schrott et al. |
| 4,918,317 A | 4/1990 | Hess et al. |
| 4,950,537 A | 8/1990 | Vesley et al. |
| 5,141,622 A | 8/1992 | Fauteux et al. |
| 5,166,041 A | 11/1992 | Murofushi |
| 5,326,677 A | 7/1994 | Fleming et al. |
| 5,395,862 A | 3/1995 | Neckers |
| 5,451,343 A | 9/1995 | Neckers |
| 5,451,932 A | 9/1995 | Wunderlich et al. |
| 5,491,262 A | 2/1996 | Hung |
| 5,527,385 A | 6/1996 | Sumii et al. |
| 5,528,222 A | 6/1996 | Moskowitz et al. |
| 5,559,983 A | 9/1996 | Masood |
| 5,608,379 A | 3/1997 | Narlow et al. |
| 5,623,080 A | 4/1997 | Neckers et al. |
| 5,695,860 A | 12/1997 | Imaichi et al. |
| 5,699,047 A | 12/1997 | Tsai et al. |
| 5,706,266 A | 1/1998 | Brownstein et al. |
| 5,728,469 A | 3/1998 | Mann et al. |
| 5,781,221 A | 7/1998 | Wen et al. |
| 5,815,484 A | 9/1998 | Smith et al. |
| 5,916,680 A | 6/1999 | Wakata et al. |
| 5,928,572 A | 7/1999 | Tonar et al. |
| 5,963,536 A | 10/1999 | Vasic et al. |
| 5,984,448 A | 11/1999 | Yanagawa |
| 5,990,188 A | 11/1999 | Patel |
| 6,000,332 A | 12/1999 | Hruby et al. |
| 6,001,471 A | 12/1999 | Bries et al. |
| 6,011,772 A | 1/2000 | Rollhaus et al. |
| 6,019,865 A | 2/2000 | Palmer et al. |
| 6,034,930 A | 3/2000 | Kitahara |
| 6,090,193 A | 7/2000 | Nigan et al. |
| 6,139,779 A | 10/2000 | Small et al. |
| 6,338,933 B1 | 1/2002 | Lawandy et al. |
| 6,398,981 B1 | 6/2002 | Galstian et al. |
| 6,434,109 B2 | 8/2002 | Rollhaus et al. |
| 6,468,619 B1 | 10/2002 | Larroche |
| 6,472,065 B1 | 10/2002 | Alahapperuma et al. |
| 6,489,892 B2 | 12/2002 | Lawandy |
| 6,511,728 B1 | 1/2003 | Bakos et al. |
| 6,514,617 B1 | 2/2003 | Hubbard et al. |
| 6,537,635 B1 | 3/2003 | Bakos et al. |
| 6,589,626 B2 | 7/2003 | Selinfreund et al. |
| 6,601,764 B1 | 8/2003 | Goodwin, III |
| 6,620,308 B2 | 9/2003 | Gilbert |
| 6,627,309 B2 | 9/2003 | Stebbing et al. |
| 6,633,853 B2 | 10/2003 | Oshima et al. |
| 6,638,593 B2 | 10/2003 | Selinfreund et al. |
| 6,641,886 B1 | 11/2003 | Bakos et al. |
| 6,709,802 B2 | 3/2004 | Lawandy et al. |
| 6,720,124 B2 | 4/2004 | Takashima |
| 6,733,950 B2 | 5/2004 | Breitung et al. |
| 6,747,930 B1 | 6/2004 | Weldon et al. |
| 6,756,103 B2 | 6/2004 | Thompson et al. |
| 6,783,991 B1 | 8/2004 | Mehta et al. |
| 6,790,501 B2 | 9/2004 | van de Grampel et al. |
| 6,795,464 B2 | 9/2004 | Lawandy |
| 6,838,144 B2 | 1/2005 | Bakos et al. |
| 6,839,316 B2 | 1/2005 | Bakos et al. |
| 6,893,718 B2 | 5/2005 | Melancon et al. |
| 6,902,111 B2 | 6/2005 | Han et al. |
| 6,952,392 B2 | 10/2005 | Vig |
| 6,990,671 B1 | 1/2006 | Evans et al. |
| 7,042,359 B2 | 5/2006 | Clucas |
| 7,058,977 B1 | 6/2006 | Furukawa et al. |
| 7,127,066 B2 | 10/2006 | Solomon et al. |
| 7,184,392 B2 | 2/2007 | Bigley |
| 7,227,445 B2 | 6/2007 | Atkinson |
| 7,315,946 B1 | 1/2008 | Blumenfeld et al. |
| 7,351,460 B2 | 4/2008 | Kojima et al. |
| 7,362,956 B2 | 4/2008 | Akita et al. |
| 7,363,642 B2 | 4/2008 | Oshima et al. |
| 7,380,711 B2 | 6/2008 | Simon et al. |
| 7,404,199 B2 | 7/2008 | Arneson et al. |
| 7,444,296 B1 | 10/2008 | Barber et al. |
| 7,606,614 B2 | 10/2009 | Licato et al. |
| 7,614,024 B2 | 11/2009 | Bothra |
| 7,653,919 B2 | 1/2010 | Potyrailo et al. |
| 2001/0028615 A1 | 10/2001 | Carson et al. |
| 2002/0001690 A1 | 1/2002 | Seliinfreund et al. |
| 2002/0012156 A1 | 1/2002 | Varaprasad et al. |
| 2002/0041443 A1 | 4/2002 | Varaprasad et al. |
| 2002/0102499 A1 | 8/2002 | Krieg-Kowald |
| 2002/0163479 A1 | 11/2002 | Lin et al. |
| 2003/0081521 A1 | 5/2003 | Solomon et al. |
| 2003/0108738 A1 | 6/2003 | Alahapperuma et al. |
| 2003/0112737 A1 | 6/2003 | Thompson et al. |
| 2003/0147339 A1 | 8/2003 | Selinfreund et al. |
| 2003/0148207 A1 | 8/2003 | Maemoto et al. |
| 2003/0150753 A1 | 8/2003 | Fraser et al. |
| 2003/0174616 A1 | 9/2003 | Constantinou et al. |
| 2003/0198892 A1 | 10/2003 | Ezbiansky et al. |
| 2003/0223348 A1 | 12/2003 | Zhang et al. |
| 2004/0004922 A1 | 1/2004 | Selinfreund et al. |
| 2004/0022542 A1 | 2/2004 | Atkinson |
| 2004/0022986 A1 | 2/2004 | Van de Grampel et al. |
| 2004/0052202 A1 | 3/2004 | Brollier |
| 2004/0054594 A1 | 3/2004 | Forster et al. |
| 2004/0083377 A1 | 4/2004 | Wu et al. |
| 2004/0120236 A1 | 6/2004 | Suzuki et al. |
| 2004/0152017 A1 | 8/2004 | Vig |
| 2004/0152127 A1 | 8/2004 | Potyrailo et al. |
| 2004/0185187 A1 | 9/2004 | Yokoyama et al. |
| 2004/0211917 A1 | 10/2004 | Adamovics |
| 2005/0005285 A1 | 1/2005 | Olson et al. |
| 2005/0050343 A1 | 3/2005 | Selinfreund et al. |
| 2005/0053865 A1 | 3/2005 | Wisnudel et al. |
| 2005/0110978 A1 | 5/2005 | Potyrailo et al. |
| 2005/0112358 A1 | 5/2005 | Potyrailo et al. |
| 2005/0167510 A1 | 8/2005 | Potyrailo et al. |
| 2005/0236107 A1 | 10/2005 | Doi et al. |
| 2006/0002269 A1 | 1/2006 | Bourget et al. |
| 2006/0005326 A1 | 1/2006 | Rollet-Corvol et al. |
| 2006/0010463 A1 | 1/2006 | Oshima et al. |
| 2006/0018231 A1 | 1/2006 | Kojima et al. |
| 2006/0028924 A1 | 2/2006 | Atkinson |
| 2006/0040400 A1 | 2/2006 | Mizutani et al. |
| 2006/0100983 A1 | 5/2006 | Atkinson et al. |
| 2006/0114755 A1 | 6/2006 | Eklund |
| 2006/0132309 A1 | 6/2006 | Posamentier |
| 2006/0158985 A1* | 7/2006 | Choi .......................... 369/47.12 |
| 2006/0159266 A1 | 7/2006 | Chavanne et al. |
| 2006/0177768 A1 | 8/2006 | Tauchi et al. |
| 2006/0185995 A1 | 8/2006 | Su |
| 2006/0227696 A1 | 10/2006 | Smith et al. |
| 2006/0234003 A1 | 10/2006 | Selinfreund |
| 2006/0237349 A1 | 10/2006 | Solomon |
| 2007/0007267 A1 | 1/2007 | Rayl et al. |
| 2007/0020560 A1 | 1/2007 | Larson |
| 2007/0024948 A1 | 2/2007 | Hirano et al. |
| 2007/0070867 A1 | 3/2007 | Forster et al. |
| 2007/0114366 A1 | 5/2007 | Wisnudel et al. |
| 2007/0114621 A1 | 5/2007 | Wisnudel |
| 2007/0115762 A1* | 5/2007 | Wisnudel et al. .......... 369/13.56 |
| 2007/0116920 A1 | 5/2007 | Krishnan et al. |
| 2007/0116988 A1 | 5/2007 | Wisnudel et al. |
| 2007/0122735 A1 | 5/2007 | Wisnudel |
| 2007/0140072 A1 | 6/2007 | Agrawal et al. |
| 2007/0141293 A1 | 6/2007 | Wisnudel et al. |
| 2007/0142502 A1 | 6/2007 | Zhu et al. |
| 2007/0143774 A1* | 6/2007 | Agrawal et al. ............... 720/738 |
| 2007/0187270 A1 | 8/2007 | Pijanowski |
| 2007/0201502 A1 | 8/2007 | Abramson |
| 2007/0231743 A1 | 10/2007 | Selinfreund et al. |
| 2007/0240607 A1 | 10/2007 | Kwan et al. |
| 2007/0257768 A1 | 11/2007 | Bowers et al. |

| | | | |
|---|---|---|---|
| 2008/0012430 | A1 | 1/2008 | Peters et al. |
| 2008/0018886 | A1 | 1/2008 | Wisnudel et al. |
| 2008/0019258 | A1* | 1/2008 | Peters et al. ............... 369/275.1 |
| 2008/0050672 | A1 | 2/2008 | Gore |
| 2008/0115155 | A1 | 5/2008 | Oshima et al. |
| 2009/0036304 | A1 | 2/2009 | Misner et al. |
| 2009/0052309 | A1 | 2/2009 | Hoffman |
| 2009/0086587 | A1 | 4/2009 | White et al. |
| 2009/0089821 | A1* | 4/2009 | White et al. ................. 720/718 |
| 2009/0141604 | A1 | 6/2009 | Tamura et al. |
| 2009/0215620 | A1 | 8/2009 | Cella et al. |
| 2009/0245080 | A1 | 10/2009 | White et al. |
| 2009/0249381 | A1 | 10/2009 | White et al. |
| 2009/0284374 | A1 | 11/2009 | Wisnudel et al. |
| 2009/0285075 | A1 | 11/2009 | Wisnudel et al. |
| 2009/0285083 | A1 | 11/2009 | Wisnudel et al. |
| 2009/0316565 | A1 | 12/2009 | Hershey et al. |
| 2010/0234493 | A1 | 9/2010 | Peters et al. |
| 2010/0234504 | A1 | 9/2010 | Fyvie et al. |

FOREIGN PATENT DOCUMENTS

| | | | |
|---|---|---|---|
| GB | | 2354834 | 4/2001 |
| JP | | 05159365 | 6/1993 |
| JP | | 11258998 | 9/1999 |
| WO | | WO9721737 | 6/1997 |
| WO | | WO9811539 | 3/1998 |
| WO | | 98/40930 A1 | 9/1998 |
| WO | | WO9840930 | 9/1998 |
| WO | | WO9941738 | 8/1999 |
| WO | | WO9967085 | 12/1999 |
| WO | | WO0062273 | 10/2000 |
| WO | | WO0079228 | 12/2000 |
| WO | | WO0109886 | 2/2001 |
| WO | | WO02075733 | 9/2002 |
| WO | | WO2004044911 | 5/2004 |
| WO | | WO2004070718 | 8/2004 |
| WO | | WO2004075188 | 9/2004 |
| WO | | 2004/095447 A1 | 11/2004 |
| WO | | WO2004095447 | 11/2004 |
| WO | | WO2005022513 | 3/2005 |
| WO | | WO2007016430 | 2/2007 |
| WO | | WO2007016546 | 2/2007 |
| WO | | WO2007059288 | 5/2007 |
| WO | | WO2007061774 | 5/2007 |
| WO | | WO2007061776 | 5/2007 |
| WO | | WO2007064526 | 6/2007 |
| WO | | WO2008036546 | 3/2008 |
| WO | | WO2008048747 | 4/2008 |

OTHER PUBLICATIONS

PCT International Search Report dated Jul. 8, 2009.
Taylor, J., Johnson, M., Crawford, C.G., "DVD Demystified", 3rd Ed., McGraw-Hill; 2006, Chapter 7-1 to 7-30 and Chapter 9-1 to 9-33. ( 65 pages).
Labarge, R., "DVD Authoring and Production", CMP Books; 2001, pp. 30-37, 198-221, 452-453. (36 pages).
Flory, P.J., Principles of Polymer Chemistry, Cornell Univ Press ( 1953) pp. 554-576.
Subhanakar, C. et al., Photochemistry of carbocyanine alkyltriphenylborate salts: intra-ion-pair electron transfer and the chemistry of boranyl radicals; Journal of the American Chemical Society, vol. 112, 6329-38 (1990) J. Am. Soc.; 1990; 112(17); 6329-6338.
Sperling, L.H., "Introduction to Physical Polymer Science", John Wiley &Sons Inc., 2nd edition (1992) pp. 130-146.
Barthelemy Nyasse, Leif Grehn, Ulf Ragnarsson, Hernani L.S. Maia, Luis S. Monteiro, Ivo Leito, Ilamar Koppel, Juta Koppel, "Synthesis and cathodic cleavage of a set of substituted benzenessulfonamides including the corresponding tert-butyl sulfonylcarbamates: pKa of sulfonamides"; J. Chem. Soc., Perkin Trans. 1, (1995) (16),2025-2031.
Collins, P., Equatorial Times No. 3, The Newsletter of the SPS 2000 Community Around the World, Dec. 1996. Available at http://www.spacefuture.com/power/equatorialtimes/3.shtml.
Srinivasan et al., "Amorphous Phenolphthalein-Based Poly (arylene ether)- Modified Cyanate Ester Networks: Microwave Processing"; Journal of Applied Polymer Science (1997) vol. 64; No. 1; pp. 179-190.
Hamley, I.W., "The Physics of Block Coploymers", Oxford Univ Press (1999) pp. 25-32.
Calvert, P., "Inkjet printing for materials and devices", Chem. Mater. (2001) 13, 3299-3305.
Henri Bouas-Laurent and Heinz Durr; Organic Photochromism; IUPAC Technical Report; Pure Appl. Chem., vol. 73, No. 4, pp. 639-665 (2001).
LaBarge, R., "DVD Authoring and Production", CMP Books (2001) pp. 30-37, 198-221,452-453. (36 pages).
de Gans, 8.-J., Schubert, U.S., "Ink-jet Printing of Well-Defined Polymer Dots and Arrays", Langmuir (2004) 20,7789-7793.
Kerr, J.B., "Polymer Electrolytes: an overview", Chapter IV-2 (2004) pp. 1-41.
Wypych, George; The Handbook of Plasticizers, ISBN 1-895198-29-1; ChemTec Laboratories, Inc., Toronto, Canada (2004).
Isaksson, J., "Electrochemical Switching of Color and Wettability in Conjugated Polymer Devices", Linkpings Universitet (2005) pp. 1-53.
O'Connor, "RF Activation Seeks to Turn Off Theft", RFID Journal, 2 pgs (2005).
PCT/US2007/080153 International Search Report mailed Nov. 8, 2006.
O'Connor, "RF Activation Seeks to Turn Off Theft", RFID Journal, 2 pgs. (2006).
Taylor, J., Johnson, M., Crawford, C.G., "DVD Demystified", 3rd Ed., McGraw-Hill (2006) Chapter 7-1 to 7-30 and Chapter 9-1 to 9-33 ( 65 pages).
"Thermal Release Sheet Revalpha"; Nittodenko Corrporation, Electronic Process Material Div. pp. 18. Also available at http://www.nitto.com/ (2006).
PCT/US2006/044541 International Search Report, Mar. 19, 2007.
PCT/US2007/77230 International Search Report mailed Apr. 16, 2008.
PCT/US2007/080153 International Search Report dated Apr. 17, 2008.
PCT/US2008/070279 International Search Report mailed Nov. 10, 2008.
PCT/US2009/040413 International Search Report mailed Jul. 8, 2009.
PCT/US2009/040506 International Search Report dated Oct. 5, 2009.
European Application No. 06838099.7 Search Report dated Jun. 4, 2010.

* cited by examiner

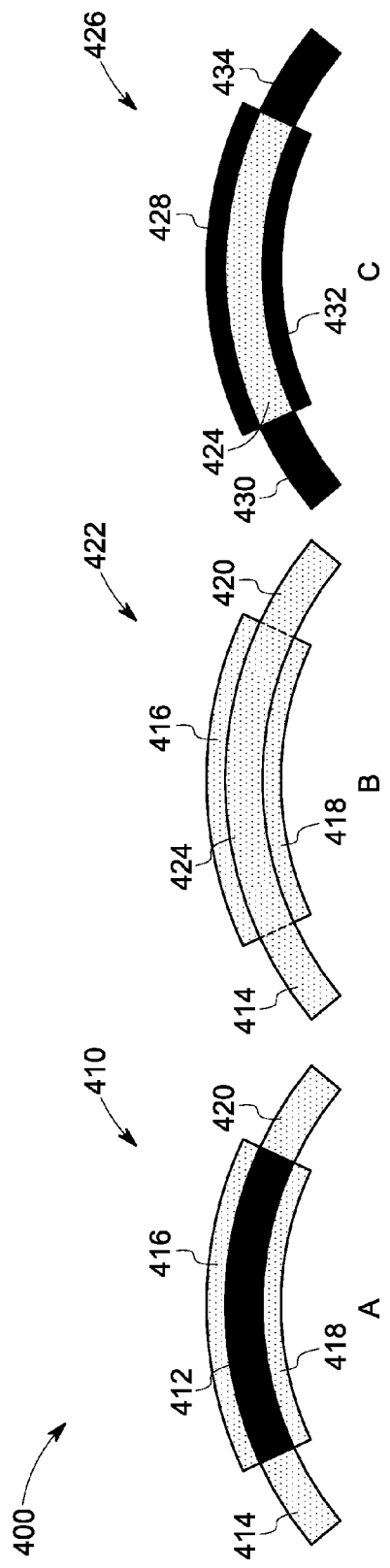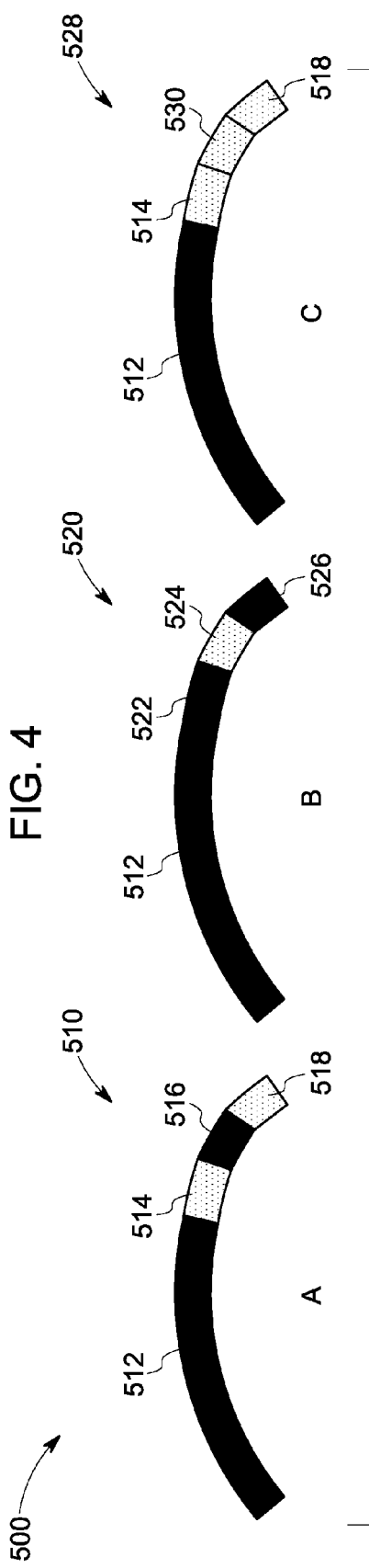

ENHANCED SECURITY OF OPTICAL ARTICLE

BACKGROUND

The invention relates generally to an optical article for playback in a player. More particularly the invention relates to an optical article with an improved security feature, an activation system for activating the optical article, and a method for rendering the optical article playable in a player.

Shoplifting is a major problem for retail venues and especially for shopping malls, where it is relatively difficult to keep an eye on each customer while they shop or move around in the store. Relatively small objects, such as CDs and DVDs are common targets as they can be easily hidden and carried out of the shops without being noticed. Shops, as well as the entertainment industry, incur monetary losses because of such instances.

Even though closed-circuit surveillance cameras may be located at such places, theft still occurs. Consumer products sometimes are equipped with theft-deterrent packaging. For example, clothing, CDs, audiotapes, DVDs and other high-value items are occasionally packaged along with tags that set off an alarm if the item is removed from the store without being purchased. These tags are engineered to detect and alert for shoplifting. For example, tags that are commonly used to secure against shoplifting are the Sensormatic® electronic article surveillance (EAS) tags based on acousto-magnetic technology. RFID tags are also employed to trace the items on store shelves and warehouses. Other theft-deterrent technologies currently used for optical discs include hub caps for DVD cases that lock down the disc and prevent it from being removed from the packaging until it is purchased, and "keepers" that attach to the outside of the DVD case packaging to prevent the opening of the package until it is purchased. In some cases, retailers have resorted to storing merchandise in locked glass display cases. In other stores, the DVD cases on the shelves are empty, and the buyer receives the actual disc only when purchased. Many of these approaches are unappealing because they add an additional inconvenience to the buyer or retailer, or they are not as effective at preventing theft as desired. Optical storage media, in particular, pose an additional problem in that their packaging and the sensor or anti-theft tags may be easily removed.

Accordingly, there remains a need for an improved solution to the long-standing problem. Point-of-sale (POS) activation reduces retail shrinkage because the optical article, for example a DVD, may not be useful i.e., may not be playable, if removed from the store prior to activation. The method described herein fills this need by providing a technology for improving the level of security of POS-activated optical media. This technology may make it more difficult for shoplifters to defeat the POS technology.

BRIEF DESCRIPTION

One embodiment of the present disclosure provides an optical article for playback in a player. The optical article includes a first file encoded on the optical article comprising data structure information, a second file encoded on the optical article comprising a backup of the first file, wherein at least one of the first file or the second file must be fully readable for the player to read the data on the optical article, and a mark disposed on at least a portion of the optical article where the first file is encoded and at least a portion of the optical article where the second file is encoded, wherein the mark comprises an optical state change material, wherein the optical state change material undergoes a change in its optical state when exposed to an activation signal selected from one or more of a laser, thermal energy, infrared rays, X-rays, gamma rays, microwaves, visible light, ultraviolet light, ultrasound waves, radio frequency waves, electrical energy, chemical energy, magnetic energy, and mechanical energy, wherein the optical article is transformed from a pre-activated state to an activated state when an authorized activation method is used, and wherein the optical article is transformed from a pre-activated state to an incorrectly activated state when an unauthorized activation method is used.

Another embodiment of the present disclosure is directed to an optical article for playback in a player. The optical article includes a mark disposed on the optical article, at least one first control logic comprising at least one sector, wherein the mark comprises an optical state change material, wherein the optical state change material undergoes a change in its optical state when exposed to an activation signal selected from one or more of a laser, thermal energy, infrared rays, X-rays, gamma rays, microwaves, visible light, ultraviolet light, ultrasound waves, radio frequency waves, electrical energy, chemical energy, magnetic energy, and mechanical energy, wherein the optical article is transformed from a pre-activated state to an activated state when an authorized activation method is used, and wherein the optical article is transformed from a pre-activated state to an incorrectly activated state when an unauthorized activation method is used, wherein the mark is in a pre-determined relationship with a sector upon which an associated first control logic is programmed, wherein each first control logic is executed only when the associated mark is in a pre-determined state.

Yet another embodiment of the present disclosure is directed to an optical article for playback in a player. The optical article includes a mark disposed on the optical article, a first control logic comprising at least one sector, a logical branch point associated with the first control logic on the disc, wherein the mark comprises an optical state change material, wherein the optical state change material undergoes a change in its optical state when exposed to an activation signal selected from one or more of a laser, thermal energy, infrared rays, X-rays, gamma rays, microwaves, visible light, ultraviolet light, ultrasound waves, radio frequency waves, electrical energy, chemical energy, magnetic energy, and mechanical energy, wherein the optical article is transformed from a pre-activated state to an activated state when an authorized activation method is used, wherein the optical article is transformed from a pre-activated state to an incorrectly activated state when an unauthorized activation method is used, wherein the mark is in a pre-determined relationship with a sector upon which the first control logic is programmed, wherein the first control logic is executed only when the associated mark is in a pre-determined state, and wherein the logical branching point has a pre-determined association with a the mark on the disc are such that if the mark is incorrectly activated the player is directed to a terminal point in the navigation of the optical article.

Still yet another embodiment of the present disclosure is directed to an optical article for playback in a player. The optical article includes a plurality of optically-detectable marks disposed on the optical article, at least one first control logic comprising at least one sector, wherein each optically detectable mark is associated with a particular first control logic, logical branch points associated with the at least one first control logic on the disc, wherein the mark comprises an optical state change material, wherein the optical state change material undergoes a change in its optical state when exposed to an activation signal selected from one or more of a laser, thermal energy, infrared rays, X-rays, gamma rays, microwaves, visible light, ultraviolet light, ultrasound waves, radio frequency waves, electrical energy, chemical energy, magnetic energy, and mechanical energy, wherein the optical article is transformed from a pre-activated state to an activated state when an authorized activation method is used, wherein the optical article is transformed from a pre-activated state to an incorrectly activated state when an unauthorized activation method is used, wherein each mark is in a pre-determined relationship with a sector upon which the associated first control logic is programmed, wherein each first control logic is executed only when the associated mark is in a pre-determined state, and wherein the logical branching points having a pre-determined association with a the marks on the disc are such that if the wrong subset of marks are activated the player is directed to a terminal point in the navigation of the optical article.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein:

FIG. 4 shows a schematic example of the geometry of optically detectable spots in accordance with an embodiment described herein.

FIG. 5 shows a schematic example of the geometry of optically detectable spots in accordance with an embodiment described herein.

DETAILED DESCRIPTION

Figure 1:
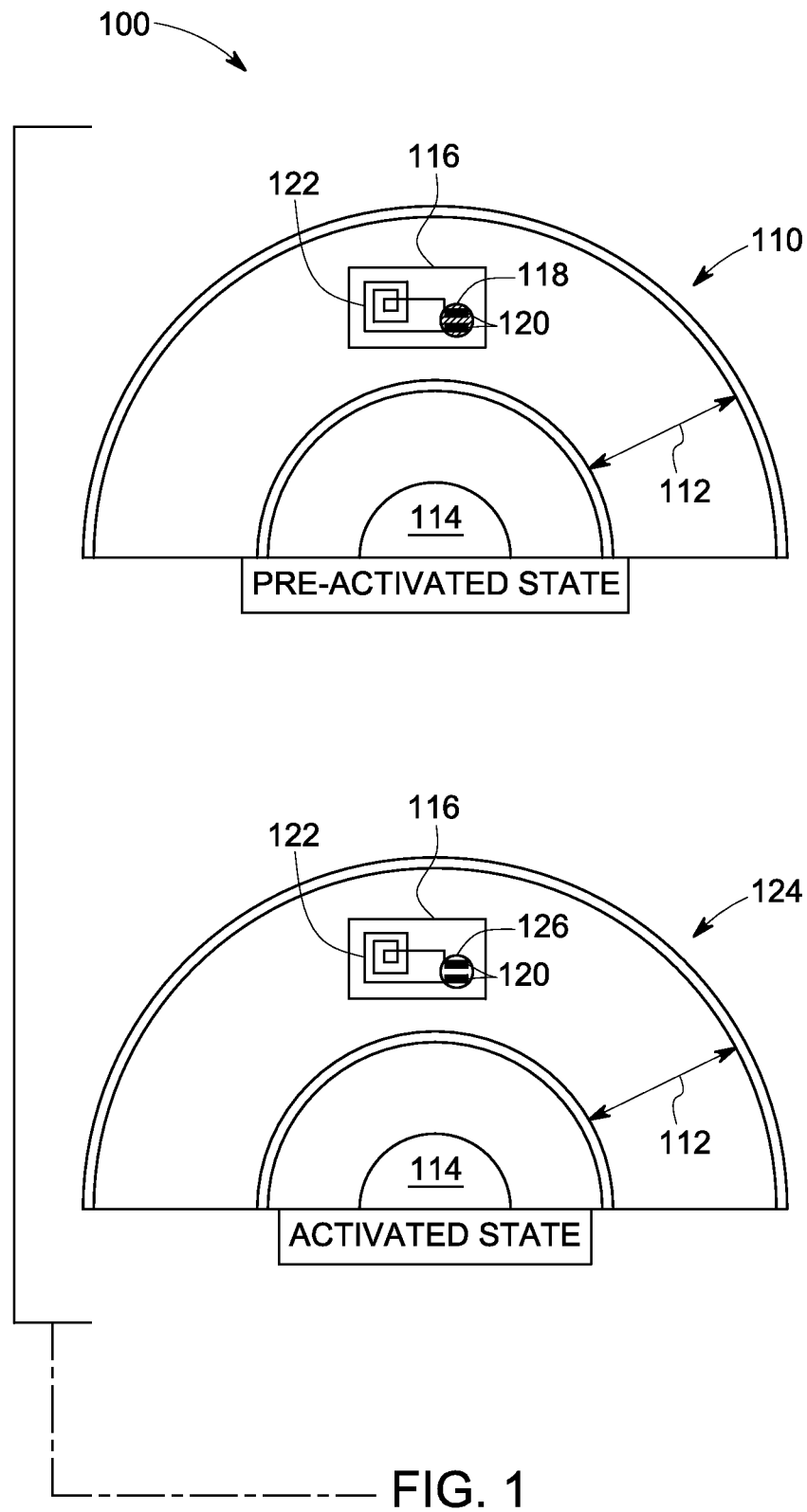
FIG. 1 shows an optical article in accordance with an embodiment described herein.

The invention relates generally to an optical article for playback in a player. More particularly the invention relates to an optical article with an improved security feature, an activation system for activating the optical article, and a method for rendering the optical article playable in a player. In one embodiment, the improved security feature is such that the optical article is not playable in a player unless it is properly activated.

Approximating language, as used herein throughout the specification and claims, may be applied to modify any quantitative representation that could permissibly vary without resulting in a change in the basic function to which it is related. Accordingly, a value modified by a term or terms, such as "about" is not limited to the precise value specified. In some instances, the approximating language may correspond to the precision of an instrument for measuring the value. Similarly, "free" may be used in combination with a term, and may include an insubstantial number, or trace amounts, while still being considered free of the modified term. The singular forms "a", "an" and "the" include plural referents unless the context clearly dictates otherwise.

One solution to the shoplifting problem, specifically for optical media articles such as DVD's, is to render at least a portion of the content of the DVD inaccessible unless the retailer at the point-of-sale (POS) has activated the DVD. One approach to rendering the content of the DVD inaccessible prior to activation is to employ an ink composition, to deposit a coating composition comprising an optical state change material in or on the DVD, wherein the coating composition at least partially absorbs the incident laser light from an optical data reader so that the complete data directly in the optical path of the laser light cannot be read. The coating composition may be deposited in the form of marks over the data or command containing regions on the optical article. In this instance, the optical article has no value, and therefore there is no incentive for the shoplifter to steal it. However, upon converting the DVD to an "activated" state using an activation signal at the point-of-sale, the coating composition becomes sufficiently transparent, with respect to the wavelength of the laser light employed in the optical data reader, due to a change in the optical properties of the coating composition, and the complete data directly in the optical path of the laser light can now be read by the incident laser light from the optical data reader, therefore rendering the full content of the DVD accessible to a legitimate consumer.

In the following descriptions, the term "opaque" implies that the mark/spot is opaque to the DVD laser at a particular wavelength i.e., substantially absorbs at a particular wavelength such as for example 650 nm (nanometers) i.e., the data below the spot is unreadable by the 650 nm laser. Similarly the term "transparent" implies that the mark/spot is essentially transparent to the DVD laser at a particular wavelength such as for example 650 nm i.e., does not absorb at a particular wavelength such as for example 650 nm. Various methods may be employed for using an activation signal to convert the DVD to an activated state. One approach is to have a plurality of optically detectable spots with multiple reactive chemistries and mark designs disposed on the surface of the DVD and use multiple activation methods to transform the spots from a first state to a second state. The spots may be configured to change their optical state in a pre-determined pattern when subject to an activation signal, such as for example, if there are multiple opaque spots, in one case upon exposure to an appropriate activation signal, the spots may get transformed according to a pre-determined combination of state changes, thereby rendering the DVD playable, and therefore rendering the full content of the DVD accessible to a legitimate consumer. In one embodiment, all the spots may get transformed from an opaque state to a transparent state. In another embodiment, a few spots may remain in the opaque state and others may get transformed to a transparent state. The activation signal may be delivered by an activation device, such as for example a POS equipment. Further the DVD may be authored with control logic encoded in the region that is at least partially covered by the spots. Once the spots are activated to obtain the pre-determined optical states, the DVD player may then be able to read or not read the control logic, which helps to the set the GPRM registers using a FOAC command and accordingly direct the player to play or not play the content.

As used herein, the terms "disposed over" or "deposited over" or "disposed between" refer to both disposed directly in contact with and indirectly by having intervening layers therebetween. "Operably coupled" is a relationship between listed parts that provides a stated function.

As used herein, the term "pre-activated" state of functionality refers to a state of functionality of the optical article where the spots have not yet been exposed to one or more activation signals, while the "activated" state refers to a state of functionality of the optical article where the only the right set of spots, i.e. the first set, has been exposed to the activation signal, and the "incorrectly activated" state refers to a state of functionality of the optical article where an incorrect set of spots, i.e. the second set, or all the spots have been exposed to the activation signal. In one embodiment, the "pre-activated" state comprises at least one spot which inhibits portions of the optical data layer that are located directly in the optical path of the incident laser light of an optical data reader from being read. The activated state comprises a state of the optical article where the optical data layer can be read by the optical data reader As used herein, the term "activated" state, refers to a state of functionality of the optical article where the optical data layer can be read by the optical data reader as a result of the right set of spots on the optical article having been exposed to at least one authorized activation signal. In one embodiment, the optical state change material is at least partially transparent to the laser from the optical data reader, and does not inhibit the data located directly in the optical path of the laser from being read. In another embodiment, the optical state change material at least partially absorbs light from the laser from the optical data reader and prevents the data directly in the optical path of the laser from being read. As used herein the term "opaque" is defined as the state of the optical state change material when it sufficiently absorbs the laser light to cause the data directly in the optical path of the laser from being read. As used herein the term "transparent" is defined as the state of the optical state change material when it does not sufficiently absorb the laser light and allows the data directly in the optical path of the laser to be read. As used herein the term "reflectivity" is defined as the ratio of reflected light to incident light.

As used herein the phrase "incorrectly activated" refers to a state of functionality of the optical article when someone tries to activate the optical article by exposing the incorrect sections of the optical article to an activation signal. An illegitimate user who may try to activate the optical article using the activation signal may end up with an incorrectly activated optical article. The phrase incorrectly activate may be construed to mean that the entire data present in the optical article may not be accessible to the illegitimate user. Depending on the manner in which the article is activated by the illegitimate user the article may be incorrectly activated in various ways: (i) the article is damaged and the illegitimate user cannot get any information from the article; (ii) some sections of the article may remain playable but will not provide any useful information to the illegitimate user; or (iii) the user may end up activating the article in the correct manner by using a serendipitous route. In one embodiment, the article may be incorrectly activated by using a wrong activation device by a legitimate user for example a person at the POS, and it may be possible to re-activate the disc by using an authorized activation method.

One embodiment of the present disclosure is directed to an optical article. The optical article includes a mark disposed on the optical article, wherein the mark comprises an optical state change material, wherein the optical state change material undergoes a change in its optical state when exposed to an activation signal selected from one or more of a laser, thermal energy, infrared rays, X-rays, gamma rays, microwaves, visible light, ultraviolet light, ultrasound waves, radio frequency waves, electrical energy, chemical energy, magnetic energy, and mechanical energy, wherein the optical article is transformed from a pre-activated state to an activated state when an authorized activation method is used, and wherein the optical article is transformed from a pre-activated state to an incorrectly activated state when an unauthorized activation method is used.

In one embodiment, the optical article is transformed from a pre-activated state to an activated state when the mark is exposed to an authorized activation signal. In another embodiment, the optical article is transformed from a pre-activated state to an incorrectly activated state when the mark is exposed to an unauthorized activation signal.

In one embodiment, the mark comprises a plurality of optically-detectable spots. In one embodiment, the plurality of optically-detectable spots comprise a first set of spots and a second set of spots. In one embodiment, the first set of spots and the second set of spots comprise an optical-state change material; wherein the optical state change material can undergo a change in its optical state when exposed to the activation signal. In one embodiment, the optical article is transformed from a pre-activated state to an activated state when the first set of spots is exposed to the activation signal. In another embodiment, the optical article is transformed from a pre-activated state to an incorrectly activated state when the second set of spots is exposed to the activation signal. For example, when a legitimate user uses an activation device to activate the optical article using an authorized activation method, the first set of spots may be activated and the optical article may be correctly activated and rendered playable by a player. When an illegitimate user uses any other method for activating the optical article using any activation device, the second set of spots may be activated and thus the optical article may be incorrectly activated and rendered unplayable by the player. Also when an illegitimate user uses any method for activating the optical article using any activation device, in one instance, both the first and second set of spots may be activated and the optical article may be incorrectly activated and rendered unplayable by the player.

In one embodiment, the mark comprises a plurality of optically-detectable spots, wherein the plurality of optically-detectable spots comprise a first set of spots and a second set of spots, wherein the first set of spots comprise a first optical state change material and the second set of spots comprise a second optical state change material, wherein the first and the second optical state change materials can undergo a change in their optical state when exposed to the activation signal, wherein the optical article is transformed from a pre-activated state to an activated state when the first set of spots is exposed to the activation signal; and wherein the optical article is transformed from a pre-activated state to an incorrectly activated state when the second set of spots is exposed to the activation signal.

In one embodiment, the first set of spots comprise a first electrochromic material and the second set of spots comprise a second electrochromic material, wherein the electrochromic materials undergo state changes at a threshold voltage, and wherein the first and the second electrochromic material undergo a state change at different threshold voltages. In one embodiment, the threshold voltage at which the electrochromic materials undergo a state change ranges from about 0.1 Volts to about 50 Volts. For example, an optical article may contain a first set of spots and a second set of spots which are opaque to the laser from a DVD player. The first set of spots may change from opaque to transparent when a voltage of 1

Volt is applied. The second set of spots may change from opaque to transparent when a voltage of 2 Volts is applied.

In another embodiment, the first set of spots comprise a first thermochromic material and the second set of spots comprise a second thermochromic material; wherein the thermochromic materials undergo state changes at a threshold temperature; and wherein the first and the second thermochromic material undergo a state change at different threshold temperatures. In one embodiment, the threshold temperature at which the thermochromic materials undergo a state change ranges from about 40° C. to about 200° C. For example, an optical article may contain a first set of spots and a second set of spots which are opaque to the laser from a DVD player. The first set of spots may change from opaque to transparent when a temperature of about 80° C. is applied. The second set of spots may change from opaque to transparent when a temperature of about 130° C. is applied.

In one embodiment, the mark comprises a combination of at least two optical state change materials, wherein the optical state change materials can undergo a change in their optical state when exposed to the activation signal. The optical article is transformed from a pre-activated state to an activated state when a first optical-state change material is exposed to the activation signal; and the optical article is transformed from a pre-activated state to an incorrectly activated state when a second optical-state change material is exposed to the activation signal.

In one embodiment, the mark comprises two different electrochromic materials that undergo state change at a threshold voltage, each of the electrochromic material undergoing a state change at a different threshold voltage. As discussed above, in one embodiment, the threshold voltage at which the electrochromic materials undergo a state change ranges from about 0.1 Volts to about 50 Volts. For example, an optical article may contain a mark comprising two different electrochromic materials, and the mark is opaque to the laser from a DVD player. The section of the mark comprising the first electrochromic material may change from opaque to transparent when a voltage of 1 Volt is applied. The section of the mark comprising the second electrochromic material may change from opaque to transparent when a voltage of 2 Volts is applied.

In another embodiment, the mark comprises two different thermochromic materials that undergo state change at a threshold temperature, each of the thermochromic material undergoing a state change at a different threshold temperature. As discussed above, in one embodiment, the threshold temperature at which the thermochromic materials undergo a state change ranges from about 40° C. to about 200° C. For example, an optical article may contain a mark comprising two different thermochromic materials, and the mark is to the laser from a DVD player. The section of the mark comprising the first thermochromic material may change from opaque to transparent when a temperature of about 80° C. is applied. The section of the mark comprising the second thermochromic material may change from opaque to transparent when a temperature of about 130° C. is applied.

In one embodiment, the mark comprises an optical state change material, wherein the optical state change material undergoes a change in its optical state when exposed to the activation signal. The optical article is transformed from a pre-activated state to an activated state when pre-determined correct sections of the mark are exposed to the activation signal, and the optical article is transformed from a pre-activated state to an incorrectly activated state when incorrect sections of the mark are exposed to the activation signal.

In one embodiment, the mark/spots includes an optical state change material comprising a dye or a reactive material. As used herein the term "optical state change" material is used to describe a material which is capable of existing in at least two different forms, each form possessing a unique optical state, for example a unique wavelength associated with a maximum optical absorbance within a range from about 200 nm to about 800 nm, or a unique extinction coefficient at a specific wavelength between about 200 nm to about 800 nm.

In one embodiment, the optical state change material is selected from one or more of a color-shift dye, a photovoltaic material, a magnetic material, an electrochromic material, a thermochromic material, a magneto-optical material, a photorefractive material, a light scattering material, and a phase change material. Non-limiting examples of optical state change materials include halochromic optical state change materials, photo-bleachable materials, polymeric materials, organic compounds, hydrogels, liquid crystalline materials, leuco dyes, inorganic compounds such as, but not limited to, metal oxides and organometallic compounds, materials capable of undergoing a sigmatropic bond rearrangement, and reactive adduct materials. In various embodiments, the optical state change materials may undergo the optical state change under the influence of thermal stimulus for example, thermochromic or an electrical stimulus for example, electrochromic. The term "thermochromic" as used herein, describes materials that undergo either a reversible or an irreversible thermally induced color change. The term "electrochromic" as used herein, describes materials that undergo either a reversible or an irreversible electrically induced color change. One suitable halochromic optical state change material that may be used in the mark is a chromic dye. As described herein the term "halochromic" describes a material which changes optical state for example, color, upon a change in pH i.e., a change in the acidity or basicity results in a change in the optical absorbance of the chromic dye. This process is also known as "acidichromism" or "halochromism". For example, the mark may contain a dye i.e., a pH responsive dye such as for example a triaryl methylene dye. One example of a triaryl methylene dye is the sodium salt of Bromocresol green, which undergoes a change in its maximum optical absorbance from about 600 nm to about 650 nm at a pH value greater than about 7 to an optical absorbance below 450 nm at a pH values less than about 5. Within the scope of this disclosure the terms "pH" or "change in pH" are used to describe the acidity, basicity, or change in acidity or basicity of the mark. A decrease in the pH is a result of an increase in acidity (or decrease in basicity) and an increase in the pH is a result of a decrease in acidity (or increase in basicity). In aqueous systems, pH values less than 7 are classified as acidic and pH values greater than 7 are classified as basic.

Non-limiting examples of dyes that can be used include bromocresol green, bromocresol purple, bromothymol blue, bromophenol blue, thymolphthalein, thymol blue, aniline blue WS, durazol blue 4R, durazol blue 8G, magenta II, mauveine, naphthalene blue black, orcein, pontamine sky blue 5B, naphthol green B, picric acid, martius yellow, naphthol yellow S, alcian yellow, fast yellow, metanil yellow, azo-eosin, xylidine ponceau, orange G, ponceau 6R, chromotrope 2R, azophloxine, lissamine fast yellow, tartrazine, amido black 10B, bismarck brown Y, congo red, congo corinth, trypan blue, Evans blue, Sudan III, Sudan IV, oil red O, Sudan black B, Biebrich scarlet, Ponceau S, woodstain scarlet, Sirius red 4B, Sirius red F3B, fast red B, fast blue B, patent blue V, auramine O, malachite green, fast green FCF, light green SF yellowish, pararosanilin, rosanilin, new fuchsin, Hoffman's violet, methyl violet 2B, crystal violet, Victoria blue 4R, methyl green, ethyl green, ethyl violet, acid fuchsin, water blue I, methyl blue, chrome violet CG, chromoxane cyanin R, Victoria blue R, Victoria blue B, night blue, pyronin Y, pyronin B, rhodamine B, fluorescein, eosin Y ws, ethyl eosin, eosin B, phloxine B, erythrosin B, rose bengal, Gallein, acriflavine, acridine orange, primuline, thioflavine T, thioflavine S, safranin O, neutral red, azocarmine G, azocarmine B, safranin O, gallocyanin, gallamine blue, celestine blue B, nile blue A, thionin, azure C, azure A, azure B, methylene blue, methylene green, toluidine blue O, alizarin, alizarin red S, purpurin, anthracene blue SWR, alizarin cyanin BBS, nuclear fast red, alizarin blue, Luxol fast blue MBS, alcian blue 8GX, saffron, Brazilin and Brazilein, hematoxylin and hematein, laccaic acid, Kermes, and carmine. Non-limiting examples of photo-bleachable materials may include dye compounds selected from xanthenes, thiazines, oxazines, triarylmethines, lactones, cyanines, fulgides, spiropyrans, and diarylethenes. Examples of dye compounds can include, but are not limited to, methylene blue, toluidine blue, Rose Bengal, erythrosine B, eosin Y, and fluorone dyes.

In various embodiments, the mark may be deposited in a discrete area on the optical article, such that at least one mark, at least one line, at least one radial arc, at least one patch, a continuous layer, or a patterned layer extends across at least a portion of the optical article. One or more marks may be deposited on the optical article in various forms, such as a discrete portion, a continuous film, or a patterned film. During authorization, the mark may be stimulated in a continuous, discontinuous or pulsed form. In one embodiment, the mark is disposed in a discrete area of the optical article in the geometry of an arc with a length and a width; wherein the length is longer than the width.

Alternatively, instead of being deposited on the surface of the optical article, the mark may be deposited inside the structure of the optical article. In optical storage articles, the mark may be deposited in the substrate on which the optical data layer is deposited. In alternate embodiments, the mark may be deposited between the layers of the optical article, or may be deposited within a layer of the optical article. For example, the ink composition may be incorporated in the UV curable adhesive of the bonding (spacer) layer. In this case it should be appreciated that these marks should be thermally stable to withstand the manufacturing temperatures of the optical article. Also, these marks may preferably absorb the wavelength of the laser light in one of the activated, or the pre-activated state of the optical article. Upon interaction with external stimulus, the mark present inside the substrate changes color. As a result, the substrate may become transparent to the laser light, thereby facilitating the transmittance of laser light through the substrate and making the optical article readable.

In one embodiment, the mark may be printed on the surface of the optical article using a method selected from one or more of a screen-printing method, a ink-jet printing method, a directwrite method, a pad printing method, a microarray deposition method, a capillary dispensing method, a gravure printing method, thermal transfer printing method, and adhesion of pre-made polymer films.

In one embodiment, the mark is coated with an encapsulating layer. One example of an encapsulation layer includes a layer formed from a silicone derivative. In one embodiment, the mark comprises a polyacrylate. In one embodiment, the polymer is polymethyl methacrylate In one embodiment, the mark absorbs light at a wavelength in a range of from about 450 nanometers to about 700 nanometers in the second optical state. In another embodiment, the mark absorbs light at a wavelength of about 650 nanometers in the second optical state. In yet another embodiment, the mark absorbs light at a wavelength of about 405 nanometers in the second optical state. In one embodiment, the mark absorbs light at a wavelength in a range of from about 450 nanometers to about 700 nanometers in the first optical state. In another embodiment, the mark absorbs light at a wavelength of about 650 nanometers in the first optical state. In yet another embodiment, the mark absorbs light at a wavelength of about 405 nanometers in the first optical state.

In one embodiment, the optical article further comprises one or more non-reactive static marks disposed on the optical article. The non-reactive static marks may be included as part of a final set of marks that may be in a pre-determined combination of their optical states along with activated states of optically detectable marks disposed on the surface of the optical article in order to render the optical article playable. The non-reactive marks may not create sufficient errors to disable the optical article. The non-reactive marks may include chemically induced haze, laser ablated marks, thermally imprinted marks or "dimples", marks containing an unbleachable dye, and marks with an opaque material.

As used herein, the term "optical article" refers to an article that includes an optical data layer for storing data. The stored data may be read by, for example, an incident laser of an optical data reader device such as a standard compact disc (CD) or digital versatile disc (DVD) drive, commonly found in most computers and home entertainment systems. In some embodiments, the optical article may include one or more data layers. Furthermore, the optical data layer may be protected by employing an outer coating, which is transparent to the incident laser light, and therefore allows the incident laser light to pass through the outer coating and reach the optical data layer. Non-limiting examples of optical articles include a compact disc (CD); a digital versatile disc (DVD); multi-layered structures, such as DVD-5 or DVD-9; multi-sided structures, such as DVD-10 or DVD-18; a high definition digital versatile disc (HD-DVD); a Blu-ray disc; a near field optical storage disc; a holographic storage medium; and a volumetric optical storage medium, such as, a multi-photon absorption storage format. In other embodiments, the optical article may also include an identification card, a passport, a payment card, a driver's license, a personal information card, or any other documents or devices, which employ an optical data layer for data storage. In one embodiment, the first surface of the optical article comprises a polycarbonate.

In one embodiment, the portion of the optical article covered by the mark undergoes at least one change selected from the group consisting of layer reflectivity, single layer reflectivity, dual layer reflectivity, refractive index, birefringence, polarization, opacity, absorbance, thickness, optical pathlength, and position, when activated using the activation method.

In one embodiment, the pre-activated state or the unplayable state is characterized by an optical reflectivity of at least one portion of the optical article having a reflectivity of less than about 20 percent based on the reflectivity of the at least one portion of the optical article in the final state i.e., the activated state or the playable state. It should be appreciated that there are analogous predetermined values of optical properties for activating different optical articles. For example, the specified (as per ECMA-267) minimum optical reflectivity for DVD-9 (dual layer) media is in a range from about 18 percent to about 30 percent and is dependent upon the layer (0 or 1).

As discussed above, the present disclosure is directed towards marks having specific optical states, disposed on an optical article, for example, a DVD for reasons of security against theft. In one example, the marks may have a high optical absorbance for the DVD-players laser beam at 650 nanometers, blocking the reading of the underlying data layers when the DVD disc is in a pre-activated state. The DVD may become playable only after it has undergone "activation" at point of sale (POS) that reduces the absorbance of the marks at 650 nanometers by a chemical reaction of the dyes or materials in that layer. In another example, marks of an electrochromic material and/or thermochromic (reactive) material may be deposited on the disc in a manner such that the disc is rendered unplayable before activation and playable after activation. The reactive material may absorb light having a wavelength of about 650 nm (i.e., the wavelength of the laser beam in a DVD reader) in one state, and be transparent to light having a wavelength of about 650 nanometers in a second state. In one embodiment, the state of the marks may be used in conjunction with control logic that are placed in the data layer during the DVD authoring process as described below. In various embodiment, the reactive material may undergo a color change by following at least one of the two routes (i) in the pre-activated state the electrochromic material may absorb a light having a wavelength of about 650 nm light and once activated (i.e., when a voltage is applied to the electrochromic mark) the material may be transparent to light having a wavelength of about 650 nanometers, and (ii) in the pre-activated state the electrochromic material may be transparent to light having a wavelength of about 650 nanometers and once activated, the material may absorb light having a wavelength of about 650 nm. In one example of a "tailored menu", where the marks are configured to be in a pre-determined optical state in the activated state of the article a mark may be transparent to the DVD player laser in the pre-activated state, thus enabling the player to read the control logic underneath that mark. The player may be instructed (based on the authored control logic) to not allow the entire DVD to be rendered playable. After activation at POS, the mark may be transformed to an opaque mark, i.e., a mark not readable by the DVD player's laser (blue, opaque, or otherwise non-transmissive to the reading laser) and the underlying control logic may not be accessible to the laser of the player. Since now the player may not be able to read the control logic instructing the player to not play the DVD, the mark being opaque, allows the player to playback the entire DVD.

Referring to FIG. 1, a section of an optical article 100, for example a DVD, is shown in a pre-activated state 110 and an activated state 124. The optical article includes a data storage region 112 and an inner hub 114. The data storage region 112 includes an optical data layer (not shown in figure), which stores the data, whereas the inner hub 114 is the non-data storage region of the optical article 100. An optically detectable mark 118 is disposed on the surface of the optical article 100 in a region over the data storage region 112. A tag 116 is disposed over the mark and the tag is operatively coupled to the mark. The tag 116 is connected to a voltage source (not shown in figure) via electrodes 120 and a circuit 122. The voltage source generates and transmits an activation signal to the tag. The tag includes electrodes or heat sources to convert the activation signal to electrical energy or thermal energy and the energy may then be transmitted to the optically detectable mark by the heater or the electrode. When the optical article 100 is in the pre-activated state 110 the mark 118 is in an opaque state i.e., interferes with the readout in the DVD player. The optical article 100 upon interaction with the activation signal undergoes an optical state change to provide an optical article in the activated state 124. When the optical article is in an activated state 124, the mark 126 is in a transparent state i.e., does not interfere with the readout in the DVD player. For example, the optically detectable mark turns from blue (i.e., absorbing at 650 nm) 118 to colorless 126. In another embodiment, the optically detectable mark initially does not interfere with the readout in the DVD player (in the pre-activated state) and then transforms to an interfering mark with respect to the readout after activation. For example the optically detectable mark turns from colorless to blue (i.e., absorbing at 650 nm).

As noted above, this change in the optical state may be caused by chemical changes within the optical state change material, which are caused by exposure to the activation signal. The mark 118,126 may cover at least a portion of the region over the data storage region 112 of the optical article 100. In the pre-activated state 110, the optical article 100 may not be readable at least in the portions where the mark 118 is disposed. In other words, the optical article in the pre-activated state 110 has a reflectivity of less than about 30 percent, in the portions where the mark 118 is disposed.

Figure 2:
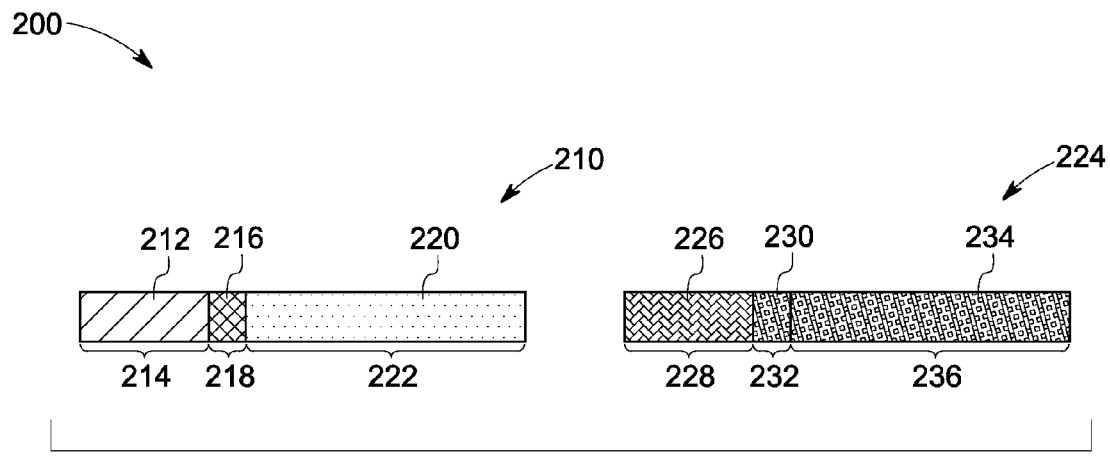
FIG. 2 shows pH dependencies of optical state change materials in accordance with an embodiment described herein.

Referring to FIG. 2, pH dependencies of optical state change materials 200 shows examples of two dyes Bromocresol green 210 and Congo red 224. The dyes have different pH dependencies as known to one skilled in the art both dyes exhibit a change in color with increasing pH. Bromocresol green is yellow 212 when in a pH range of 0 to 4 214, green 216 in a pH range of 4 to 5 218 and blue 220 in a pH range of 5 to 14 222. Congo red 224 is blue 226 in a pH range of 0 to 4 228, violet 230 in a pH range of 4 to 5 232 and red 234 in a pH range of 5 to 14 236.

Figure 3:
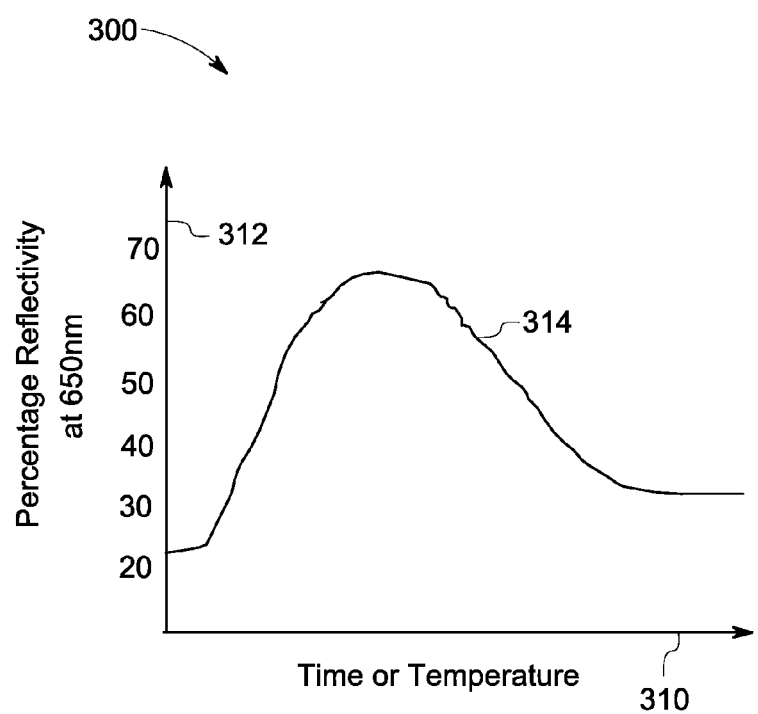
FIG. 3 shows a graph depicting the effect of time or temperature on the reflectivity of an optical state change material in accordance with an embodiment described herein.

As discussed above in one embodiment, multiple chemistries for example, different dyes or pH indicators may be combined and used together in one optically detectable mark. In one embodiment, two or more pH-sensitive dyes or pH indicators may be combined in such a manner that the printed mark may be yellow, i.e., transparent to the DVD player's laser only in a narrow pH range. For example, bromocresol green and congo red may be combined in such a manner that the color or reflectivity at 650 nanometers may change non-linearly with the change in pH. In one embodiment, when the mark is heated, a thermal-acid generator may decrease the local pH and the color or reflectivity at 650 nanometers may change non-linearly as shown in FIG. 3. In one embodiment, the optical article may be activated using a time-dependent activation signal. In another embodiment, the optical article may be activated using a temperature-dependent activation signal.

Referring to FIG. 3, a time or temperature versus percentage reflectivity profile 300 shows a change in percentage reflectivity 312 (y-axis) at a wavelength of 650 nm of an optically detectable mark with a change in the heating time or the temperature 310 (x-axis). A curve 314 illustrates the concept that the color or percent reflectivity at 650 nanometers may change nonlinearly with the pH of the medium. Further the desired level of reflectivity may be achieved only at a threshold temperature or time. The curve 314 indicates that the optically detectable mark has an initial percent reflectivity of about 22 percent and as the temperature increases the percent reflectivity peaks to about to about 65 percent. As the temperature increases further, the reflectivity drops to about 32 percent. For example, the medium in this case may be an optically detectable mark comprising bromocresol green and congo red. The pH of this medium may be changed when heated, for example, the mark may become more acidic after being heated due to the presence of a thermal-acid generator in the medium. When the mark is heated to a particular temperature, the pH in the mark may be at a value such that the mark may be yellow in color with a percent reflectivity at 650 nm greater than about 30 percent, and hence transparent to the DVD player's laser thus rendering the disc playable. In an event when the disc is heated at a higher temperature or at the same temperature for a longer period of time, the pH in the mark may be at a value such that the mark may be blue in color and hence opaque to the DVD player's laser, thus rendering the disc unplayable. The DVD should be heated appropriately such that the desired state change in the optically detectable mark is achieved. For example, if appropriately heated the mark may go from opaque to transparent, while too much heating (resulting in the production of too much acid) may result in the mark going back to an opaque state and hence rendering the disc unplayable. As discussed in FIG. 1, the heat required for heating the mark may be provided through the electrodes attached to the tag. In one embodiment, a successful POS activation may occur only within a narrow range of time and/or temperature. If an illegitimate user tries to activate the DVD, the user may end up overheating the optically detectable mark and the disc may be rendered unplayable.

In one embodiment, the optical article may be disabled by creating sufficient errors, i.e., deposit sufficient marks, either by corruption or by causing tracking errors, in a manner such that the data from the optical article may not be recoverable. Corruption must be sufficient so that the DVD error correction algorithms may not allow the data to be recoverable. However once the article is legitimately activated, a sufficient number of the errors are removed, i.e., marks may be rendered to a state where the recovery of the data from the optical article is made possible. If the errors are sufficient in the disabled or pre-activated state that section of the optical article comprising the errors may be unreadable. It is desirable to minimize the area of the optically detectable mark that needs to be activated. The optically detectable marks may be deposited on the surface of the optical article using a number of different geometries. Furthermore, as a means to deter unauthorized activation of the optical article, additional intentional errors may be generated or removed if the optical article is improperly activated. Such errors are referred to as "bogey" errors and cause the optical article to be disabled.

As discussed above, in one embodiment, the geometry of a mark used to disable the optical article is in the form of an arc comprising a optical state change material that disrupts the reading of the optical media along the surface of the optical article in the same direction as the data is read. Furthermore, by locating the arc over the table of contents (TOC) region in the data storage region of the optical article, the DVD player is unable to read the data in the TOC region, i.e., the TOC is corrupted, and the optical article is rendered unplayable. In one embodiment, the arc length may be a key parameter in corrupting the TOC. For example, by making arcs having a width ranging from about 1 millimeter to about 2 millimeter and varying lengths with a black permanent marker over the TOC, it is found that with the arc lengths of at least 6 millimeters, the optical article could not be read consistently and with arc lengths over 7 millimeters the optical articles are generally disabled.

Referring to FIG. 4, a schematic example of the geometry of optically detectable marks 400 shows a pre-activated arc A 410, a properly activated arc B 422 and an improperly activated arc C 426. The pre-activated arc A 410 includes a single opaque arc 412 and several bogey arcs 414, 416, 418, and 420 which may be transparent or partially opaque to the DVD player's laser. The opaque arcs may be responsible for creating errors in a pre-activated disc, while the bogey arcs do not create sufficient errors to disable the pre-activated disc. When the disc is properly activated, i.e., activated at a POS equipment configured to activate the disc, the arc A 410 gets transformed to an arc B 422 wherein the opaque arc 412 shown in arc A 410 is transformed to a partially opaque or transparent arc 424 capable of being read by the DVD player's laser. Since the disc is properly or legitimately activated the bogey arcs remain in the same state as in the pre-activated state, and the disc is rendered playable, since as discussed above, the bogey arcs do not create sufficient errors to disable the pre-activated disc. When the disc is improperly activated, i.e., an illegitimate user heats the disc, the arc A 410 gets transformed to an arc C 426 wherein the opaque arc 412 shown in arc A 410 may be transformed to a partially opaque or transparent arc 424 capable of being read by the DVD player's laser, but the bogey arcs 414, 416, 418, and 420 which initially were either transparent or partially opaque to the DVD player's laser, are now transformed to fully opaque arcs 430, 428, 434 and 432 respectively thus creating sufficient errors to disable the pre-activated disc and render the disc unplayable.

Referring to FIG. 5, a schematic example of the geometry of optically detectable marks 500 shows a pre-activated arc A 510, an improperly activated arc B 520 and a properly activated arc C 530. The pre-activated arc A 510 includes a series of short sections 512, 514, 516, and 518 of which sections 512 and 516 may be opaque to the DVD player's laser and sections 514 and 518 and may be transparent or partially opaque to the DVD player's laser in the pre-activated state. The state of the sections in the arc in the pre-activated and activated state may be configured such that if the disc is properly activated or activated using an authorized method some of the sections in the arc may change from opaque to partially opaque or transparent, some of the sections in the arc may change from partially opaque or transparent to opaque and some of the sections in the arc may remain in the original pre-activated state. As discussed above a predetermined combination of the state of the sections in the arc renders the disc playable. In this case, when the disc is improperly activated i.e., an unauthorized user heats the disc, the arc A 510 gets transformed to an arc B 520 wherein the opaque section 516 may be transformed to a partially opaque or transparent section 524, the sections 514 and 518 may be transformed to opaque sections 522 and 526 respectively, and section 512 may remain opaque and this combination of the state of the various sections may render the DVD unplayable. When the disc is improperly activated, i.e., activated at a POS equipment configured to activate the disc, the arc A 510 gets transformed to an arc C 528 wherein the opaque section 516 shown in arc A 510 may be transformed to a partially opaque or transparent section 530, sections 512, 514 and 518 remain in the original opaque state and this pre-determined combination of the state of the various sections may render the DVD playable. In one embodiment, if an unauthorized user tries to scratch off the mark from the surface of the optical article in a pre-activated state, the user may end up rendering the optical article permanently unplayable.

Figure 6:
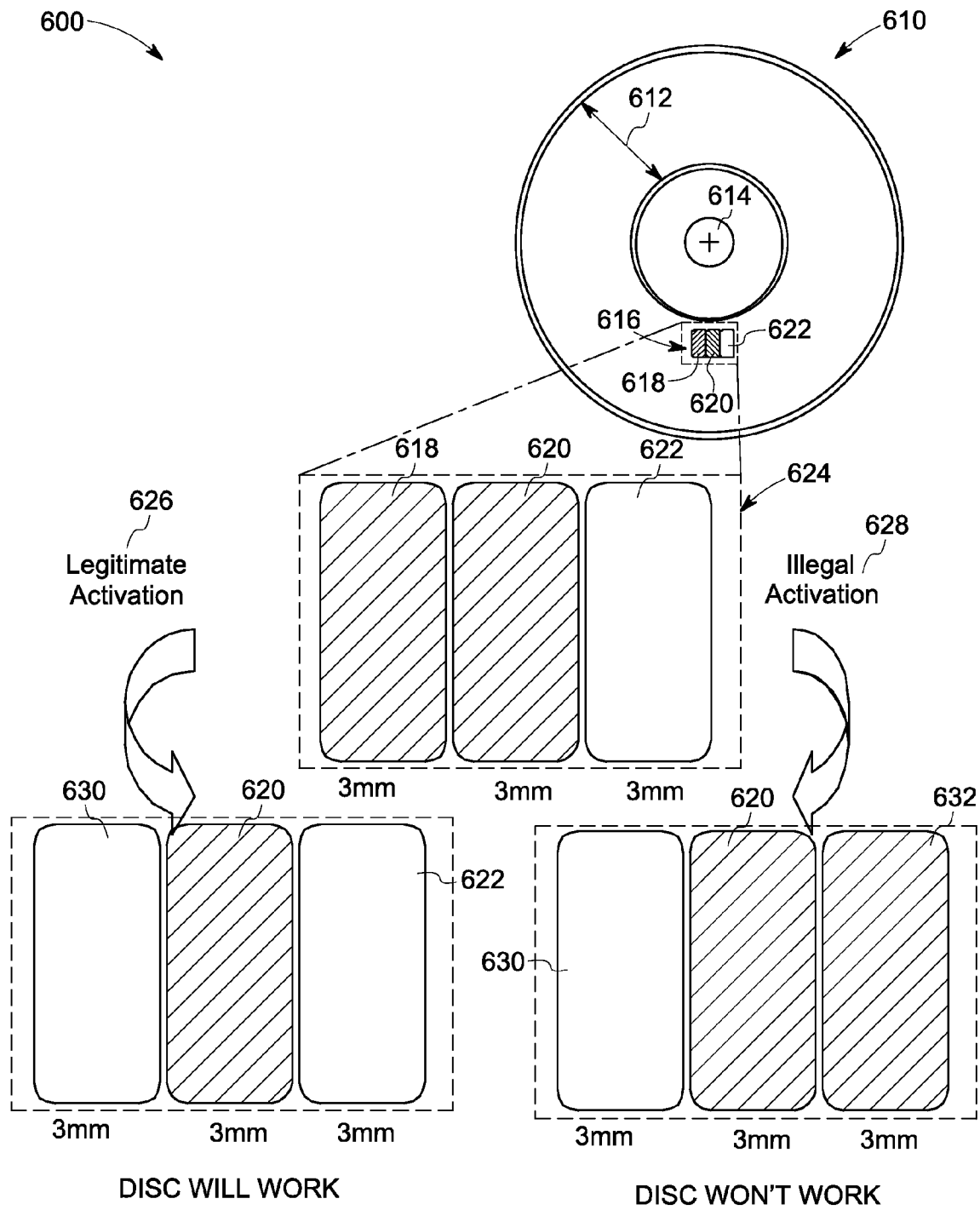
FIG. 6 shows a schematic example of the chemistry of optically detectable spots in accordance with an embodiment described herein.

Referring to FIG. 6, a schematic example 600 of the chemistry of optically detectable marks shows the effect of legitimate activation 626 and illegitimate activation 628 on an optical article 610. The optical article 610 includes a data storage region 612 and an inner hub 614. The data storage region 612 includes an optical data layer (not shown in figure), which stores the data, whereas the inner hub 614 is the non-data storage region of the optical article 610. Optically detectable marks 616 including marks having different chemistries may be disposed on the data containing sector 612 of the optical article. As shown by a magnified image of the marks 624, the marks 616 include a first opaque mark 618 wherein an ink composition used to deposit the marks comprises a blue dye, for example, bromocresol green and a thermal acid generator, a second opaque mark 620 wherein an ink composition used to deposit the marks comprises the blue dye and no thermal acid generator, and a third transparent mark 622 wherein an ink composition used to deposit the marks comprises a bogey dye, for example, crystal violet lactone and the thermal acid generator, wherein the dyes are opaque or transparent in relation to the DVD player's laser. When the optically detectable marks are legitimately activated, using a POS equipment configured to activate the marks, the first opaque mark 618 gets transformed to a transparent mark 630 and the second mark 620 and the third mark 622 remain in the same state as in the pre-activated state. This combination of the state of marks, i.e., transparent 630, opaque 620 and transparent 622 renders the DVD playable. When the optically detectable marks are illegitimately activated, i.e., all the marks are using any available heating device, the first opaque mark 618 gets transformed to a transparent mark 630 as it is in the case of the legitimate activation, the second mark 620 remains in the same state, but the third mark 622 gets transformed to an opaque mark 632. This combination of the state of marks, i.e., transparent mark 630, opaque mark 620 and opaque mark 632 renders the DVD unplayable.

Figure 7:
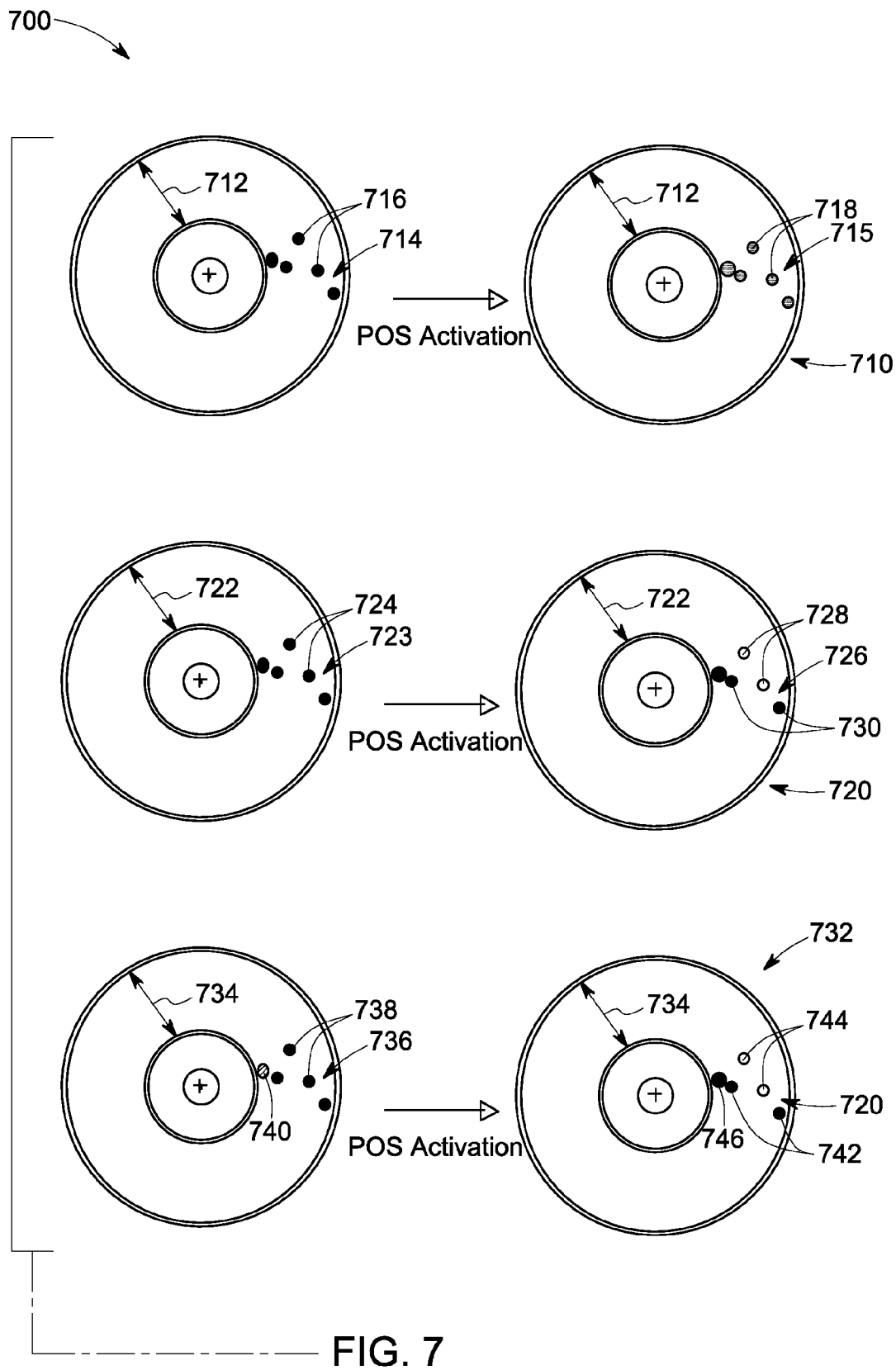
FIG. 7 shows various scenarios for depositing the optically detective spots on an optical article in accordance with an embodiment described herein.

Referring to FIG. 7, various scenarios 700 for depositing the optically detectable marks on an optical article are shown. In a first scenario 710, a set of multiple spots 714 with one chemistry 716, for example spots comprising an electrochromic material may be deposited in the data storage region 712 which includes an optical data layer (not shown in figure). The logic used here could be a simple logic such as for example, if a DVD player's laser encounters a blue spot, i.e., a spot opaque to the laser, the player may stall or may be redirected to a special menu, but the player is unable to play the content in the DVD. However, once the DVD is legitimately activated by a POS equipment, all the spots of the set of spots 714 are transformed to a set of multiple spots 715 wherein the spots are transparent 718, to the DVD player's laser, the data on the DVD below the marks may be readable, and the DVD player is able to play the contents on the DVD. The first scenario 710 may be aimed at making the activation process more difficult for an illegitimate user, under the premise that more spots means more work for the shoplifter.

In a second scenario 720, a set of multiple spots 723 with one chemistry 724 may be deposited in the data storage region 722 which includes an optical data layer (not shown in figure). The logic used here could be a more complicated logic such as for example, in the pre-activated state all the spots may be opaque if a DVD player's laser encounters a blue spot, i.e., a spot opaque to the laser, the player may stall or may be redirected to a special menu, resulting in the player being unable to play the content in the DVD. However, once the DVD is legitimately activated by a POS equipment, the set of multiple spots 723 may get transformed to a set of multiple spots 726 where some of the spots may be rendered transparent 728 and some of the spots may remain opaque 730 to the DVD player's laser. The disc may include logic authored into the data containing sectors to direct the player to play the disc if the DVD player's laser can detect and read the right combination of opaque and transparent spots. The logic used herein may be more complicated since there may be multiple spots with one chemistry and the player may need to check the logic authored into each relevant sector underneath the spots. The content is rendered playable only if the appropriate spots are readable by the DVD player. The second scenario 720 may be aimed at making the activation process even more difficult for an illegitimate user, under the premise that the shoplifter needs to know the right combination of spots to be activated to render the optical article playable.

In a third scenario 732, a set of multiple spots 736 with multiple chemistries 740 and 738 may be deposited in the data storage region 734 which includes an optical data layer (not shown in figure). The logic used here could be a much more complicated logic such as for example, in the pre-activated state the spots may be in combination of an opaque and a transparent state with respect to a DVD player's laser, i.e., some spots may be blue and some spots may be yellow. If the data below the appropriate spots is not readable, the player may not be able to play the disc. However, once the DVD is legitimately activated by a POS equipment, the set of spots 736 may get transformed to a set of spots 742, wherein the transparent spot 740 gets transformed to an opaque spot 746, some of the opaque spots 738 may be rendered transparent 744, and some of the opaque spots 736 remain opaque to the DVD player's laser. The disc may include logic authored into the data containing sectors to direct the player to play the disc if the DVD player's laser can detect and read the right combination of opaque and transparent spots. The logic used herein may be more complicated as though there may be multiple spots with multiple chemistries wherein a player needs to check the logic authored into each relevant sector underneath the spots and the content is playable only if appropriate spots are readable. Multiple chemistries means that some spots may change from blue to yellow, yellow to blue, or some spots may remain unchanged. The third scenario 732 may be aimed at making the activation process much more difficult for an illegitimate user, under the premise that the shoplifter needs to know the right combination of spots to be activated to render the optical article playable.

Another embodiment of the present disclosure is directed to a method for changing the functionality of an optical article. The method includes the steps of providing an optical article, wherein the mark comprises an optical state change material, wherein the optical state change material undergoes a change in its optical state when exposed to an activation signal selected from one or more of a laser, thermal energy, infrared rays, X-rays, gamma rays, microwaves, visible light, ultraviolet light, ultrasound waves, radio frequency waves, electrical energy, chemical energy, magnetic energy, and mechanical energy, attaching an activation device to the optical article, wherein the activation device is operatively coupled with the plurality of optically-detectable spots, wherein the mark is activated using an activation method that comprises applying a time dependent activation signal to the activation device, transmitting the activation signal from the activation device to the mark, wherein the optical article is transformed from a pre-activated state to an activated state when an authorized activation method is used, and wherein the optical article is transformed from a pre-activated state to an incorrectly activated state when an unauthorized activation method is used.

Yet another embodiment of the present disclosure is directed to a system for changing a functionality of an optical article. The system includes an optical article comprising, an optical data layer for storing data, wherein the data is readable from the optical data layer in an activated state of functionality, a device to provide an activation signal, a mark disposed on the optical article, wherein the mark comprises an optical state change material, wherein the optical state change material undergoes a change in its optical state when exposed to an activation signal selected from one or more of a laser, thermal energy, infrared rays, X-rays, gamma rays, microwaves, visible light, ultraviolet light, ultrasound waves, radio frequency waves, electrical energy, chemical energy, magnetic energy, and mechanical energy, attaching an activation device to the optical article, wherein the activation device is operatively coupled with the mark, wherein the mark is activated using an activation method that comprises applying a time dependent activation signal to the activation device, transmitting the activation signal from the activation device to the mark, wherein the optical article is transformed from a pre-activated state to an activated state when an authorized activation method is used, and wherein the optical article is transformed from a pre-activated state to an incorrectly activated state when an unauthorized activation method is used.

Still yet another embodiment of the present disclosure is directed to an optical article. The optical article includes a plurality of optically-detectable spots disposed on the optical article, wherein the plurality of optically-detectable spots comprise a first set of spots and a second set of spots, wherein the plurality of optically-detectable spots comprise an optical state change material, wherein the optical state change material undergoes a change in its optical state when exposed to an activation signal selected from one or more of a laser, thermal energy, infrared rays, X-rays, gamma rays, microwaves, visible light, ultraviolet light, ultrasound waves, radio frequency waves, electrical energy, chemical energy, magnetic energy, and mechanical energy, wherein the optical article is transformed from a pre-activated state to an activated state when the first set of spots are exposed to an activation signal, and wherein the optical article is transformed from a pre-activated state to an incorrectly activated state when the second set of spots are exposed to the activation signal.

Still yet another embodiment of the present disclosure is directed to an optical article. The optical article includes a mark disposed on the optical article, wherein the mark comprises an optical state change material, wherein the optical state change material undergoes a change in its optical state when exposed to an activation signal selected from one or more of a laser, thermal energy, infrared rays, X-rays, gamma rays, microwaves, visible light, ultraviolet light, ultrasound waves, radio frequency waves, electrical energy, chemical energy, magnetic energy, and mechanical energy, wherein the optical article is transformed from a pre-activated state to an activated state when pre-determined correct sections of the mark are exposed to an activation signal, and wherein the optical article is transformed from a pre-activated state to an incorrectly activated state when incorrect sections of the mark are exposed to the activation signal.

Still yet another embodiment of the present disclosure provides an optical article for playback in a player. The optical article includes a first file encoded on the optical article comprising data structure information, a second file encoded on the optical article comprising a backup of the first file, wherein at least one of the first file or the second file must be fully readable for the player to read the data on the optical article, and a mark disposed on at least a portion of the optical article where the first file is encoded and at least a portion of the optical article where the second file is encoded, wherein the mark comprises an optical state change material, wherein the optical state change material undergoes a change in its optical state when exposed to an activation signal selected from one or more of a laser, thermal energy, infrared rays, X-rays, gamma rays, microwaves, visible light, ultraviolet light, ultrasound waves, radio frequency waves, electrical energy, chemical energy, magnetic energy, and mechanical energy, wherein the optical article is transformed from a pre-activated state to an activated state when an authorized activation method is used, and wherein the optical article is transformed from a pre-activated state to an incorrectly activated state when an unauthorized activation method is used.

In one embodiment, the first file is the IFO and the second file is the BUP. In one embodiment, the first file and the second file comprise the data structure information for the entire optical article. The data structure information also referred to as the video manager, may comprise files that include information required for the player to access and play the DVD-video content in each of the video titles stored on the disc i.e., the volume of the disc, the directory or TOC in the disc, and the file structure information as discussed in pages 30 to 33 of "DVD Authoring and Production" by LaBarge (2001). In other words the video manager acts like a table of contents for all the data stored in the DVD-Video area of the disc, and the video manager information is contained within data tables in the IFO. If this file cannot be read, the player cannot access any of the data on the disc i.e., within a title set.

In one embodiment, the first file and the second file represent the data structure information for a video title encoded on the optical article. In one embodiment, the optical article is transformed from a pre-activated state to an activated state when using an authorized activation method and the content within the video title set is accessible to the player.

Still yet another embodiment of the present disclosure is directed to an optical article for playback in a player. The optical article includes a mark disposed on the optical article, a first control logic comprising at least one sector, a logical branch point associated with the first control logic on the disc, wherein the mark comprises an optical state change material, wherein the optical state change material undergoes a change in its optical state when exposed to an activation signal selected from one or more of a laser, thermal energy, infrared rays, X-rays, gamma rays, microwaves, visible light, ultraviolet light, ultrasound waves, radio frequency waves, electrical energy, chemical energy, magnetic energy, and mechanical energy, wherein the optical article is transformed from a pre-activated state to an activated state when an authorized activation method is used, wherein the optical article is transformed from a pre-activated state to an incorrectly activated state when an unauthorized activation method is used, wherein the mark is in a pre-determined relationship with a sector upon which the first control logic is programmed, wherein the first control logic is executed only when the associated mark is in a pre-determined state, and wherein the logical branching point has a pre-determined association with a the mark on the disc are such that if the mark is incorrectly activated the player is directed to a terminal point in the navigation of the optical article.

Still yet another embodiment of the present disclosure is directed to an optical article for playback in a player. The optical article includes a plurality of optically-detectable marks disposed on the optical article, at least one first control logic comprising at least one sector, wherein each optically detectable mark is associated with a particular first control logic, logical branch points associated with the at least one first control logic on the disc, wherein the mark comprises an optical state change material, wherein the optical state change material undergoes a change in its optical state when exposed to an activation signal selected from one or more of a laser, thermal energy, infrared rays, X-rays, gamma rays, microwaves, visible light, ultraviolet light, ultrasound waves, radio frequency waves, electrical energy, chemical energy, magnetic energy, and mechanical energy, wherein the optical article is transformed from a pre-activated state to an activated state when an authorized activation method is used, wherein the optical article is transformed from a pre-activated state to an incorrectly activated state when an unauthorized activation method is used, wherein each mark is in a pre-determined relationship with a sector upon which the associated first control logic is programmed, wherein each first control logic is executed only when the associated mark is in a pre-determined state, and wherein the logical branching points having a pre-determined association with a the marks on the disc are such that if the wrong subset of marks are activated the player is directed to a terminal point in the navigation of the optical article.

In one embodiment, a first optically-detectable spot is in a pre-determined relationship with an associated first control logic and one or more additional optically detectable spots are in pre-determined relationships with additional associated control logics, wherein the optical article is transformed from a pre-activated state to an activated state when the correct set of optically-detectable spots are activated thereby allowing the associated control logics to be executed. In another embodiment, for each bit of the first control logic a player is directed to set the non-default value of the register using a forced activation method, wherein the register has a default value before it is set and a non-default value after it is set. As discussed above, in one embodiment, the mark absorbs light at a wavelength in a range of from about 400 nanometers to about 700 nanometers in the first optical state. In another embodiment, the mark absorbs light at a wavelength in a range of from about 400 nanometers to about 700 nanometers in the second optical state.

In one embodiment, for each first control logic encoded in a sector, a second control logic is encoded in sectors which are in proximity to the first control logic, wherein the mark is in a pre-determined relationship with a sector upon which the associated first control logic is programmed, wherein the second control logic is not obscured by the optically detectable mark associated with the first control logic. In one embodiment, the second control logic is physically placed on a second sector at a nearby angle and data track to a first sector comprising the first control logic, such that the two sectors exist at the closest possible physical location such that the second control logic is not obscured by the printed mark. In one embodiment, for each non-executable bit of the first control logic determining a portion of the player readable code, the second control logic is readable. For example, a DVD-disc may have a first control logic comprising a first sector. A mark as discussed in the various embodiments provided above may be disposed over the first sector. A second control logic comprising a second sector may be disposed at a distance in close proximity to the first sector. In one embodiment, if the second control logic is located adjacent tangentially to the first control logic then the second control logic is in an adjacent sector or Error Correction Code (ECC) block. If the second control logic is adjacent radially to the first control logic, then it is located in another adjacent data track i.e., a large multiple of sectors away from the first control logic. The marks on the first and the second sectors may be close enough such that it would be obscured by marks with hand printed precision but may not be obscured by marks with commercial printing precision. Thus, the distance at which the second sector is located is such that if the DVD-disc is not activated using the pre-determined method i.e., using good precision, it may be possible that the second sector may also be affected by the activation signal. In one example, where the mark over the first sector is transformed from a transparent spot to an opaque spot the mark over the second sector should be initially be transparent, such that if the disc is not legitimately activated using the precise pre-determined activation method and activation signal the mark of the second sector may also be transformed from transparent to opaque, thus rendering the disk unplayable. In other words, by making an additional 1-bit code and tying the code to each spot with a pre-determined relationship one can ensure that printed marks may get activated with excellent precision in a proper manner, and the code work properly, to render the disc playable. These parallel sectors with identical Forced Activation Commands (FOAC Commands), which may render the disc unplayable, may be encoded in the disc. As is known to one skilled in the art, FOAC is a specific method for authoring a control logic. The sectors may be located at a suitable distance such that the commands are not masked while printing the marks during manufacturing of the optical article. However, if an illegitimate user attempts trial & error erasure of visible marks and/or creates new temporary or permanent marks to crack the security code, the illegitimate user may accidentally mask these FOAC commands and thus render the disc unplayable. In another embodiment, two FOAC commands may be included in ECC blocks that are azimuthally "adjacent" i.e., the FOAC commands may be in a subsequent ECC block, it will be on the same data track, but further downstream in the read direction. In this embodiment, the spot quality may determine whether the disc is activated using an authorized pre-determined method or an unauthorized method. For example, a smooth printed mark would render the disc playable while a rough, thick mark from felt-tip marker may render the disc unplayable.

In certain embodiments, where the mark comprises a plurality of spots, the activation of the spots may result in changing the size of the spots based on whether an authorized or an unauthorized method being employed to activate the spots. In one embodiment, authoring (navigation logic) methods are used to check if the reactive spots have the correct size and shape. Suppose that an appropriate activation at POS results in a very specific size and shape of reacted (e.g., yellow) spot. A shoplifted and illegally altered disc may not have the same precisely-sized or shaped spots. A method could be used to check for these small but discernable signatures. For example, the process would involve checking sector x (where the spot should be) to see if it is playable or not. Then, sectors x±A will be checked in series to determine if adjacent locations are playable or not (where A is some small integer). Depending on the outcome, the player could be directed to play the content if the correct sectors have the correct response and not play the content if the incorrect sectors have been altered.

Still yet another embodiment of the present disclosure is directed to an optical article for playback in a player. The optical article includes a mark disposed on the optical article, at least one first control logic comprising at least one sector, logical branch points associated with the at least one first control logic on the disc, wherein the mark comprises an optical state change material, wherein the optical state change material undergoes a change in its optical state when exposed to an activation signal selected from one or more of a laser, thermal energy, infrared rays, X-rays, gamma rays, microwaves, visible light, ultraviolet light, ultrasound waves, radio frequency waves, electrical energy, chemical energy, magnetic energy, and mechanical energy, wherein the optical article is transformed from a pre-activated state to an activated state when an authorized activation method is used, and wherein the optical article is transformed from a pre-activated state to an incorrectly activated state when an unauthorized activation method is used, wherein the mark is in a pre-determined relationship with a sector upon which an associated first control logic is programmed, wherein each first control logic is executed only when the associated mark is in a pre-determined state, and wherein the logical branching points having a pre-determined association with a particular mark on the disc are such that if a mark is incorrectly activated the player is directed to a terminal point in the navigation of the optical article. The terminal point of navigation of the optical article may have a control logic, which includes authoring to direct the player to disable the navigation functions and to play a still or video loop indefinitely.

The default value of the register may be set when the optical article is inserted in a player. The control logic is configured to set the non-default value of the register using a FOAC method. The FOAC method utilizes the menu commands on the player to activate the control logic resulting in the player changing the register values during playback of the optical article. The player reaches a branch point on the disc and may be forced to make a logical decision to play the content or to not play the content on the optical article, based on the value of the GPRM registers as set by the control logic. In one embodiment, the content may include an advertisement, an audio trailer, a video trailer, a promotional video, a short feature, and a movie.

Each GPRM register is typically an unsigned 16-bit quantity or 2 bytes of storage, corresponding to the range of from about 0 to about 70000. Each GPRM register contains a value that can be modified under program control to create complex branching in the playback of the optical article. GPRM register values can be calculated during playback, and the appropriate navigation decisions may be taken based upon the computed result. A set GPRM command performs an arithmetic or bitwise calculation based on a source and a destination. The result is stored in the destination, which is the GPRM register.

For example, GPRM registers and navigation commands are defined in conventional DVD players. Every video piece on a DVD falls under a program chain logical structure. In a DVD, a program chain (PGC) is a collection of programs, or groups of cells, linked together to form a sequential presentation. The navigation commands defined by the DVD may be used by a DVD developer to control reading and playback of content data stored on the DVD through logic control commands (i.e., control software) stored in the pre-command, post-command, cell-command and button-command areas in the DVD.

A pre-command is a navigation command that may be executed before the presentation of a PGC has been started. An example of a pre-command use would be for the player to decide to play in French language while playing video from a PGC. This would be done via a pre-command on that PGC, and the decision would be based on a GPRM register that was set by the user at a previous time to play the movie in French. The pre-command orders the player to check the value of the GPRM then makes a navigation decision, such as for example, to use the French audio stream during playback of the PGC. In various embodiments, the pre-command may be used to select the default audio language based upon region setting or control access by prompting for passwords.

A post-command is a navigation command that is to be executed just before the presentation of a PGC has been completed. As discussed above for the pre-command, the post-command may also be based on a GPRM value that has been set previously.

A cell-command is a navigation command that may be executed when the presentation of a cell has been completed. A cell is a unit of a video stored on the optical article, and may be anywhere from a fraction of a second to more than two hours long. Cells allow the video to be grouped for sharing content among titles, interleaving for multiple angles, etc. So a cell command is like a pre- or post-command, but is executed in the middle of the PGC but at the end of a cell within that PGC.

Pre-command, post-command, and cell-command may be considered as execute commands, as they may not allow for user input at the time of the navigation command. They allow decisions to be made by the player during playback of the video. According to the DVD specifications, these commands may be located in sectors that also contain critical navigation data for the PGC. So if these commands may be covered by a mark that may at least partially obscure these commands, the player may not be able to navigate through the PGC via these commands.

Button commands are navigation commands that may be associated with the menu buttons in the DVD and executed whenever the viewer activates the button. Only a single navigation command can be associated with a menu button. Button commands are distinctly different from the above commands, they are embedded in a video stream and thus they can be isolated from critical data to allow for continuous video playback. For example, while playing the main menu, the player can be showing a short video loop. As soon as the viewer selects a button, then the player immediately moves on to the start of the movie or the special feature. A button command is the only command that can take input directly from a user. Button commands can be used to set GPRM registers so later, during the playback of the video, the playback goes as the user specifies for instance, as described in the French audio stream example above.

A FOAC method as described herein is a subset of a button command. In this case, the player initiates its own button activation. As discussed in detail below the FOAC may be used to command the player to change a GPRM register. The GPRM register value may then be checked later using the pre-command to execute the desired navigation i.e., to play the content or not to play the content contained in the DVD.

In another embodiment, the at least one sector may in addition, include a title trap. The title trap may be located sequentially after the first control logic directing the player to play the next bit of the content, which is accessed in the event that there is a tracking failure during reading of the first control logic. The title trap may be accessed if the player skips while reading the first control logic. As explained, if the player "skips" upon encountering the mark, the tendency of the player is to jump i.e., move on to the next title sequence on the optical article. Title trap prevent uncontrolled navigation of the disc.

Figure 8:
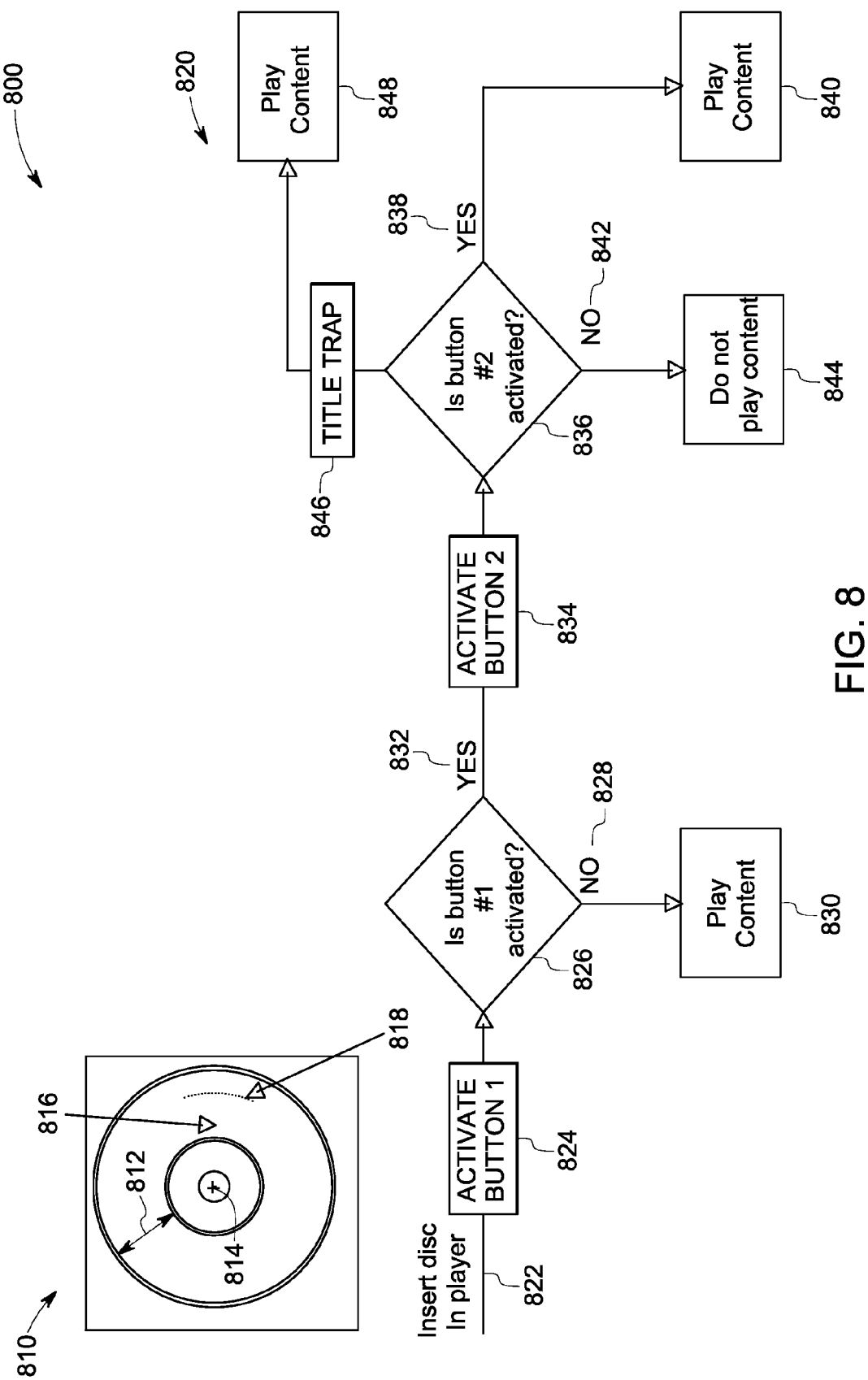
FIG. 8 shows a logical layout of an optical article in accordance with an embodiment described herein.

Referring to FIG. 8, a logical layout of content 800 in an optical article is provided wherein a single mark is deposited on the surface of the optical article. The optical article 810 includes a data storage region 812 and an inner hub 814. The data storage region 812 includes an optical data layer (not shown in figure), which stores the data, whereas the inner hub 814 is the non-data storage region of the optical article 810. Control logics may be authored in the data storage region 814, a process for reading the control logic is described in the logical layout 820. The optical article 812 having a sector 816 where the control logic is not obscured by a mark and another sector 818 where the control logic is obscured by the single mark, wherein the mark contains a heat-sensitive dye, is inserted 822 in a player. The player is instructed to perform the function of activating button 1 824, the pre-test command. The player then checks if the button 1 is activated 826. If the button 1 is not activated 828 the player moves on to the main menu on the optical article and from where the player may be directed to play the content 830, for example a movie. If the button 1 is activated 832 the player then moves on to attempt to read the sector containing the command to activate the button 2 834. The player then checks if the button 2, the control logic, which is obscured by the mark 836 is activated. If the button 2 is activated 838 the player moves on to the main menu from where the player may be directed to play the content 840. If the button 2 is not activated 842 the player does not play the content 844. If the player skips during the activation of button 2 the player jumps to a title trap 846. As explained above, title trap prevents uncontrolled navigation of the disc by directing the player to jump to a title i.e. the title trap if the player "skips" to the next title sequence on the optical article upon encountering a mark that obscures the second content. The player then moves on to play the content 848.

Figure 9:
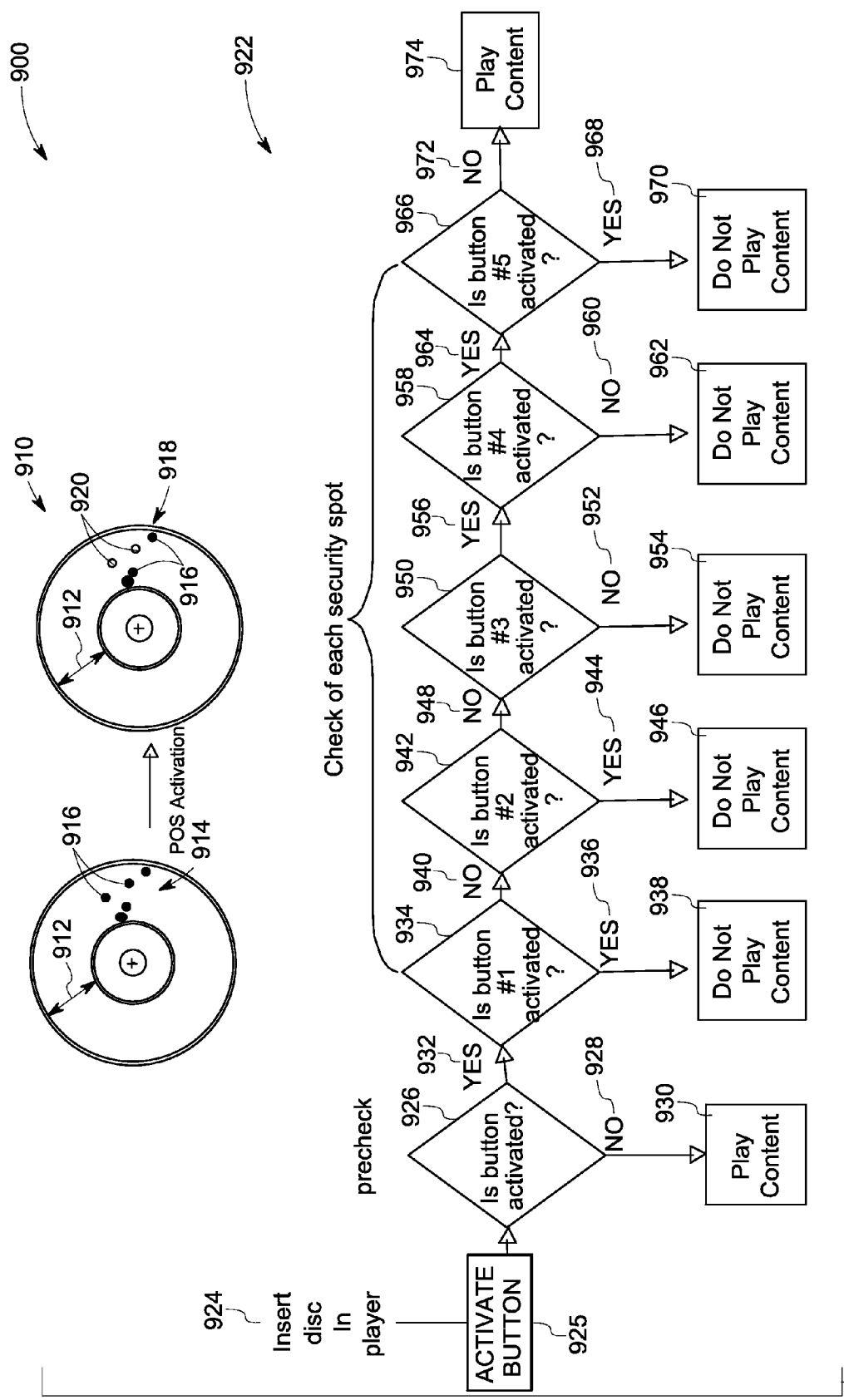
FIG. 9 shows a logical layout of an optical article in accordance with an embodiment described herein.

Referring to FIG. 9, a logical layout of content 900 in an optical article is provided. Also shown in the figure is the optical article 910 with multiple spots 914 with one chemistry, deposited in the data storage region 912 which includes an optical data layer (not shown in figure). As described above in the second scenario in FIG. 7, the optical article on being legitimately activated, the multiple spots 914 including opaque spots 916 get transformed to a set of multiple spots 918 including some opaque spots 916 and some transparent spots 920. Thus this optical article with five spots encodes the sequence (1,1,0,0,1) i.e., nonreadable, nonreadable, readable, readable, nonreadable) i.e., (blue, blue, yellow, yellow, blue) by the DVD player's laser. Only the correct sequence of readable or unreadable sectors will result in playable content. Upon unsuccessful activation (or in the case of a stolen disc), one could envision that some content on the disc is playable and some (e.g., the main feature is not).

Control logics may be authored in the data storage region 912, a process for reading the control logic is described in the logical layout 922. Once the optical article is activated using a POS equipment, the optical article 910 having a sector where the control logic is obscured by the spots 918, wherein the spot contains a heat-sensitive dye, is inserted 924 in a player. The player is instructed to follow a set of instructions depicted by the logical layout 922. The player is instructed to perform the function of activating a pre-check button 925, using a pre-test command. The player then checks if the pre-check button is activated 926. If the pre-check button 925 is not activated 928 the player moves on to the main menu on the optical article and from where the player may be directed to play the content 930, for example a movie. If the pre-check button 925 is activated 932 the player then moves on to attempt to read the sector containing the command to activate the button 1 934. The player then checks if the button 1, the control logic, which is obscured by the spot, is activated (not shown in figure). If the button 1 is activated 936 the player does not play the content 938. If the button 1 is not activated 940 the player is instructed to perform the function of activation (not shown in figure) of button 2. The player then checks if the button 2 is activated 942. If button 2 is activated 944 the player does not play the content 946. If button 2 is not activated 948 the player is instructed to perform the function of activation (not shown in figure) of button 3. The player then checks if the button 3 is activated 950. If button 3 is not activated 952 the player does not play the content 954. If button 3 is activated the player is instructed to perform the function of activation (not shown in figure) of button 4. The player then checks if the button 4 is activated 958. If button 4 is not activated 960 the player does not play the content 962. If button 4 is activated 964 the player is instructed to perform the function of activation (not shown in figure) of button 5. The player then checks if the button 5 is activated 966. If button 5 is activated 968 the player does not play the content 970. If button 5 is not activated 972 the player moves on to the main menu play the content 974. Thus when the five spots on the optical article encode the sequence i.e., nonreadable, nonreadable, readable, readable, nonreadable), the player uses the FOAC method to set the GPRM registers of the corresponding sectors to predetermined values of (1,1,0,0,1), thereby instructing the player to provide full access to the content on the optical article.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An optical article for playback in a player comprising:
a first file encoded on the optical article comprising data structure information, wherein the data structure information comprises information required for the player to access and play video content in each video title stored on the optical article;
a second file encoded on the optical article comprising a backup of the first file;
wherein at least one of the first file or the second file must be fully readable for the player to play the video content on the optical article; and
a mark disposed on at least a portion of the optical article where the first file is encoded and disposed on at least a portion of the optical article where the second file is encoded;
wherein the mark comprises an optical state change material that undergoes a change in its optical state when exposed to an activation signal selected from one or more of a laser, thermal energy, infrared rays, X-rays, gamma rays, microwaves, visible light, ultraviolet light, ultrasound waves, radio frequency waves, electrical energy, chemical energy, magnetic energy, and mechanical energy;
wherein the optical article is transformed from a pre-activated state, where the player is unable to read either of the first or second file, to an activated state, where the player is able to read either of the first or second file, when an authorized activation method is used to activate the mark; and
wherein the optical article is transformed from the pre-activated state to an incorrectly activated state, where the player is unable to read either of the first or second file, when an unauthorized activation method is used to activate the mark.

2. The optical article of claim 1, wherein the optical article is transformed from the pre-activated state to the activated state when the mark is exposed to an authorized activation signal and wherein the optical article is transformed from the pre-activated state to the incorrectly activated state when the mark is exposed to an unauthorized activation signal.

3. The optical article of claim 1, wherein the first file is the IFO and the second file is the BUP.

4. The optical article of claim 1, wherein the first file and the second file comprise the data structure information for the entire optical article.

5. The optical article of claim 1, wherein the mark comprises a plurality of optically-detectable spots;
wherein the plurality of optically-detectable spots comprise a first set of spots and a second set of spots;
wherein the first set of spots and the second set of spots comprise the optical-state change material;

wherein the optical article is transformed from the pre-activated state to the activated state when the first set of spots is exposed to the activation signal; and wherein the optical article is transformed from a pre-activated state to the incorrectly activated state when the second set of spots is exposed to the activation signal.

6. The optical article of claim 1, wherein the mark comprises a plurality of optically-detectable spots;

wherein the plurality of optically-detectable spots comprise a first set of spots and a second set of spots;

wherein the first set of spots comprise a first optical state change material and the second set of spots comprise a second optical state change material;

wherein the first and the second optical state change materials can undergo a change in their optical state from a first optical state to a second optical state when exposed to the activation signal;

wherein the optical article is transformed from the pre-activated state to the activated state when the first set of spots is exposed to the activation signal; and wherein the optical article is transformed from the pre-activated state to the incorrectly activated state when the second set of spots is exposed to the activation signal.

7. The optical article of claim 6, wherein the first set of spots comprise a first electrochromic material and the second set of spots comprise a second electrochromic material; wherein the first and second electrochromic materials undergo state changes at a threshold voltage; wherein the first and the second electrochromic materials undergo the state change at different threshold voltages.

8. The optical article of claim 7, wherein the mark absorbs light at a wavelength in a range of from about 400 nanometers to about 700 nanometers in the second optical state.

9. The optical article of claim 7, wherein the mark absorbs light at a wavelength of about 650 nanometers in the second optical state and does not absorb light at a wavelength of about 650 nanometers in the first optical state.

10. The optical article of claim 7, wherein the mark absorbs light at a wavelength of about 405 nanometers in the second optical state and does not absorb light at a wavelength of about 405 nanometers in the first optical state.

11. The optical article of claim 6, wherein the first set of spots comprise a first thermochromic material and the second set of spots comprise a second thermochromic material; wherein the first and second thermochromic materials undergo state changes at a threshold temperature; and wherein the first and the second thermochromic materials undergo the state change at different threshold temperatures.

12. The optical article of claim 11, wherein the mark absorbs light at a wavelength in a range of from about 400 nanometers to about 700 nanometers in the second optical state.

13. The optical article of claim 11, wherein the mark absorbs light at a wavelength of about 650 nanometers in the second optical state and does not absorb light at a wavelength of about 650 nanometers in the first optical state.

14. The optical article of claim 11, wherein the mark absorbs light at a wavelength of about 405 nanometers in the second optical state and does not absorb light at a wavelength of about 405 nanometers in the first optical state.

15. The optical article of claim 1, wherein the mark comprises a combination of at least two optical state change materials;

wherein the optical state change materials can undergo a change in their optical state when exposed to the activation signal;

wherein the optical article is transformed from the pre-activated state to the activated state when a first optical-state change material is exposed to the activation signal; and wherein the optical article is transformed from a pre-activated state to the incorrectly activated state when a second optical-state change material is exposed to the activation signal.

16. The optical article of claim 15, wherein the mark comprises a plurality of optically-detectable spots;

wherein the plurality of optically-detectable spots comprise a first set of spots and a second set of spots;

wherein the first set of spots comprise a first electrochromic material and the second set of spots comprise a second electrochromic material; wherein the first and the second electrochromic materials undergo a state change at different threshold voltages.

17. The optical article of claim 15, wherein the mark comprises a plurality of optically-detectable spots;

wherein the plurality of optically-detectable spots comprise a first set of spots and a second set of spots;

wherein the first set of spots comprise a first thermochromic material and the second set of spots comprise a second thermochromic material; and wherein the first and the second thermochromic materials undergo a state change at different threshold temperatures.

18. The optical article of claim 1, wherein the optical article is transformed from the pre-activated state to the activated state when first pre-determined sections of the mark are exposed to the activation signal; and wherein the optical article is transformed from the pre-activated state to the incorrectly activated state when second pre-determined sections of the mark are exposed to the activation signal.

19. The optical article of claim 1, wherein the mark is disposed in a discrete area of the optical article having the geometry of an arc with a length and a width, wherein the length is longer than the width.

20. The optical article of claim 1, wherein a portion of the optical article covered by the mark undergoes at least one change selected from the group consisting of layer reflectivity, single layer reflectivity, dual layer reflectivity, refractive index, birefringence, polarization, opacity, absorbance, thickness, optical pathlength, and position, when activated using the pre-determined activation method.

21. The optical article of claim 1, wherein the pre-activated state is characterized by an optical reflectivity of at least one portion of the optical article having a reflectivity of less than about 20 percent based on the reflectivity of the at least one portion of the optical article in the activated state.

22. The optical article of claim 1, wherein said optical article is selected from one or more of a CD, a DVD, a HD-DVD, a Blu-ray disc, a near field optical storage disc, a holographic storage medium, or another like volumetric optical storage medium, an identification card, a passport, a payment card, a driving license, and a personal information card.

23. The optical article of claim 1, wherein the optical state change material is selected from one or more of a color-shift dye, a halochromic material, a photovoltaic material, a magnetic material, an electrochromic material, a thermochromic material, a magnetooptical material, a photorefractive material, photobleachable material, a light scattering material, and a phase change material.

24. The optical article of claim 1, wherein the optical article further comprises one or more of a non-reactive static mark disposed on the optical article.

25. The optical article of claim 1, wherein the mark absorbs light at a wavelength in a range of from about 400 nanometers to about 700 nanometers before exposure to the activation signal.

26. The optical article of claim 1, wherein the mark absorbs light at a wavelength in a range of from about 400 nanometers to about 700 nanometers before exposure to the activation signal.

27. The optical article of claim 1, wherein the optical article is activated using a time-dependent activation signal.

28. An optical article for playback in a player comprising:
a mark disposed on the optical article;
a plurality of control logics encoded within respective sectors of the optical article, wherein each control logic of the plurality of control logics is configured to change a value of a register from a default value to a non-default value via a forced activation method;
wherein the mark comprises a plurality of optically detectable spots comprising an optical state change material;
wherein the optical state change material undergoes a change in its optical state when exposed to an activation signal selected from one or more of a laser, thermal energy, infrared rays, X-rays, gamma rays, microwaves, visible light, ultraviolet light, ultrasound waves, radio frequency waves, electrical energy, chemical energy, magnetic energy, and mechanical energy;
wherein the optical article is transformed from a pre-activated state, in which movie content stored on the optical article is unable to be played by the player, to an activated state, in which movie content is able to be played by the player, when an authorized activation method is used to activate the mark;
wherein the optical article is transformed from the pre-activated state to an incorrectly activated state, in which the movie content is unable to be played by the player, when an unauthorized activation method is used to activate the mark;
wherein the mark is in a pre-determined relationship with the respective sectors such that, in the pre-activated state, the plurality of optically detectable spots enable a first combination of the plurality of control logics to be read and executed by the player, in the activated state, the plurality of optically detectable spots enable a second combination of the plurality of control logics to be read and executed by the player, and in the incorrectly activated state, the plurality of optically detectable spots enable a third combination of the plurality of control logics to be read and executed by the player;
wherein the first combination of the plurality of control logics, when executed by the player, cause the register values to prevent the movie content from being playable by the player, the second combination of the plurality of control logics, when executed by the player, cause the register values to enable the movie content to be played by the player, and the third combination of the plurality of control logics, when executed by the player, cause the register values to prevent the movie content from being playable by the player.

29. The optical article of claim 28, wherein the mark absorbs light at a wavelength in a range of from about 400 nanometers to about 700 nanometers in the first optical state.

30. The optical article of claim 28, wherein the mark absorbs light at a wavelength in a range of from about 400 nanometers to about 700 nanometers in the second optical state.

31. The optical article of claim 28, wherein for each first control logic of the plurality of control logics encoded in a respective sector, a second control logic is encoded in sectors which are in proximity to the first control logic;
wherein the second control logic is not obscured by the optically detectable mark associated with the first control logic.

32. The optical article of claim 31, wherein the second control logic is physically placed on a second sector at a nearby angle and data track to a first sector comprising the first control logic, such that the two sectors exist at the closest possible physical location such that the second control logic is not obscured by the optically detectable mark.

33. The optical article of claim 31, wherein the second control logic is physically placed on a second sector at a nearby angle and data track to a first sector comprising the first control logic, such that the two sectors exist at azimuthally adjacent physical locations such that the second control logic is not obscured by the optically detectable mark.

34. The optical article of claim 31, wherein for each non-executable first control logic determining a portion of a player readable code, the second control logic must remain readable for the disc to be properly activated.

35. An optical article for playback in a player comprising:
a mark disposed on the optical article;
a first control logic;
a logical branch point associated with the first control logic;
wherein the mark comprises an optical state change material; wherein the optical state change material undergoes a change in its optical state when exposed to an activation signal selected from one or more of a laser, thermal energy, infrared rays, X-rays, gamma rays, microwaves, visible light, ultraviolet light, ultrasound waves, radio frequency waves, electrical energy, chemical energy, magnetic energy, and mechanical energy;
wherein the optical article is transformed from a pre-activated state, in which movie content stored on the optical article is unable to be played by the player, to an activated state, in which the movie content is able to be played by the player, when an authorized activation method is used to activate the mark;
wherein the optical article is transformed from the pre-activated state to an incorrectly activated state, in which the movie content is unable to be played by the player, when an unauthorized activation method is used to activate the mark;
wherein the mark is in a pre-determined relationship with a sector upon which the first control logic is programmed;
wherein the first control logic is executed only when the associated mark is in a pre-determined state; and
wherein the logical branching point has a pre-determined association with the mark such that if the mark is incorrectly activated the player is directed to a terminal point in the navigation of the optical article, wherein the terminal point comprises a second control logic that, when executed by the player, disables navigation of the optical article and directs the player to play a still or a video loop indefinitely.

36. An optical article for playback in a player comprising:
a plurality of optically-detectable marks disposed on the optical article;
at least one first control logic;
wherein each optically detectable mark is associated with a particular first control logic;
logical branch points associated with the at least one first control logic;
wherein the mark comprises an optical state change material; wherein the optical state change material undergoes a change in its optical state when exposed to an activation signal selected from one or more of a laser, thermal energy, infrared rays, X-rays, gamma rays, microwaves, visible light, ultraviolet light, ultrasound waves, radio frequency waves, electrical energy, chemical energy, magnetic energy, and mechanical energy;

wherein the optical article is transformed from a pre-activated state, in which movie content stored on the optical article is unable to be played by the player, to an activated state, in which the movie content is able to be played by the player, when an authorized activation method is used;

wherein the optical article is transformed from the pre-activated state to an incorrectly activated state, in which the movie content is unable to be played by the player, when an unauthorized activation method is used;

wherein each mark is in a pre-determined relationship with a sector upon which the associated first control logic is programmed;

wherein each first control logic is executed only when the associated mark is in a pre-determined state; and wherein the logical branching points having the pre-determined association with the marks are such that if the wrong subset of marks are activated the player is directed to a terminal point in the navigation of the optical article, wherein the terminal point comprises a second control logic that, when executed by the player, disables navigation of the optical article and directs the player to play a still or a video loop indefinitely.

* * * * *